(12) United States Patent
Schmeichel

(10) Patent No.: US 7,195,304 B1
(45) Date of Patent: Mar. 27, 2007

(54) ROLL TARP SYSTEM

(76) Inventor: Kurt D. Schmeichel, P.O. Box 125, Courtenay, ND (US) 58426

( * ) Notice: Subject to any disclaimer, the term of this patent is extended or adjusted under 35 U.S.C. 154(b) by 0 days.

(21) Appl. No.: 11/367,896

(22) Filed: Mar. 3, 2006

Related U.S. Application Data

(63) Continuation-in-part of application No. 11/155,258, filed on Jun. 16, 2005.

(51) Int. Cl.
*B60P 7/04* (2006.01)

(52) U.S. Cl. .................... 296/98; 296/100.14

(58) Field of Classification Search ............. 296/98, 296/100.14; 160/69, 70, 78, 79
See application file for complete search history.

(56) References Cited

U.S. PATENT DOCUMENTS

2003/0090124 A1* 5/2003 Nolan et al. ............. 296/98

* cited by examiner

*Primary Examiner*—Joseph D. Pape

(57) ABSTRACT

A roll tarp system for use upon vehicles and trailers with rear doors or gates. The roll tarp system includes a tarp attached to a side of a container, a roller attached to the tarp opposite of the container, a rear inner arm pivotally attached to the container, a first bias member attached to the rear inner arm, a rear outer arm attached to the first bias member, a second bias member attached to the rear outer arm and rotatably connected to a rear end of the roller and a front support structure rotatably connected to a front end of the roller.

20 Claims, 26 Drawing Sheets ies. The invention is capable of other embodiments and of
ROLL TARP SYSTEM

CROSS REFERENCE TO RELATED APPLICATIONS

I hereby claim benefit under Title 35, United States Code, Section 120 of U.S. patent application Ser. No. 11/155,258 filed Jun. 16, 2005. This application is a continuation-in-part of the Ser. No. 11/155,258 application filed Jun. 16, 2005. The Ser. No. 11/155,258 application is currently pending. The Ser. No. 11/155,258 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to roll tarps for vehicles and trailers and more specifically it relates to a roll tarp system for use upon vehicles and trailers with rear doors or gates.

2. Description of the Related Art

Any discussion of the prior art throughout the specification should in no way be considered as an admission that such prior art is widely known or forms part of common general knowledge in the field.

Roll tarps have been in use for years. Typically, a roll tarp is comprised of a tarp attached to the side of a trailer or truck, an elongated roller attached to the tarp opposite of the side of the trailer or truck, and an actuator attached to the elongated roller for rolling the roller in a closed/open position with respect to the container. The actuator may be comprised of a hand crank or an electric motor.

While these devices may be suitable for the particular purpose to which they address, they are not as suitable for use upon vehicles and trailers with rear doors or gates. Conventional roll tarps cannot be utilized upon vehicles or trailers with rear doors or gates, or must be removed to allow for use when opening the doors or gates.

In these respects, the roll tarp system according to the present invention substantially departs from the conventional concepts and designs of the prior art, and in so doing provides an apparatus primarily developed for the purpose of use upon vehicles and trailers with rear doors or gates.

BRIEF SUMMARY OF THE INVENTION

In view of the foregoing disadvantages inherent in the known types of roll tarps now present in the prior art, the present invention provides a new roll tarp system construction wherein the same can be utilized for use upon vehicles and trailers with rear doors or gates.

The general purpose of the present invention, which will be described subsequently in greater detail, is to provide a new roll tarp system that has many of the advantages of the roll tarps mentioned heretofore and many novel features that result in a new roll tarp system which is not anticipated, rendered obvious, suggested, or even implied by any of the prior art roll tarps, either alone or in any combination thereof.

To attain this, the present invention generally comprises a tarp attached to a side of a container, a roller attached to the tarp opposite of the container, a rear inner arm pivotally attached to the container, a first bias member attached to the rear inner arm, a rear outer arm attached to the first bias member, a second bias member attached to the rear outer arm and rotatably connected to a rear end of the roller and a front support structure rotatably connected to a front end of the roller.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a roll tarp system that will overcome the shortcomings of the prior art devices.

A second object is to provide a roll tarp system for use upon vehicles and trailers with rear doors or gates.

Another object is to provide a roll tarp system that may be utilized upon various types of trucks and trailers.

An additional object is to provide a roll tarp system that allows rear doors and gates to open without requiring removal of the roll tarp system.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
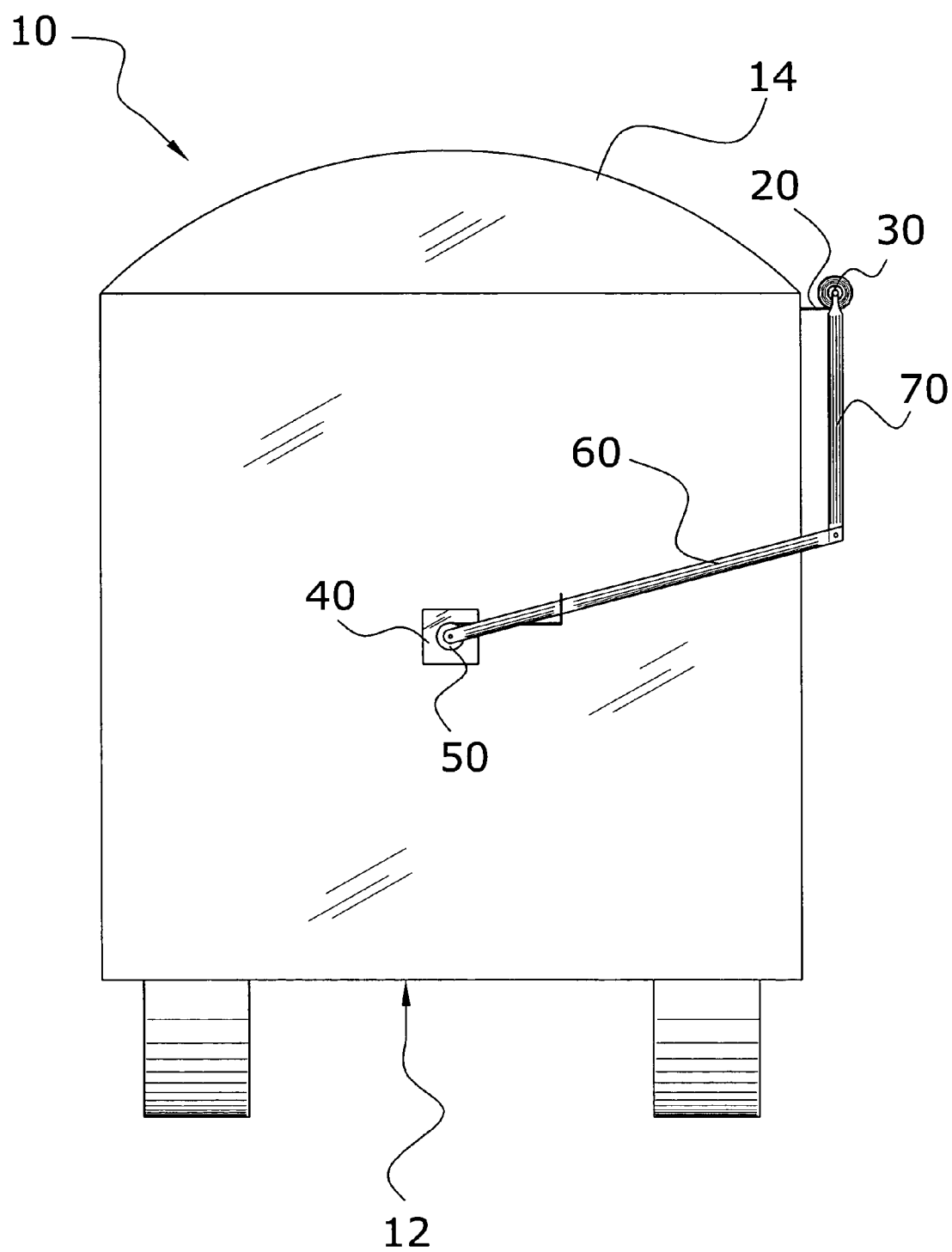
FIG. 1 is rear view of the present invention attached to a container in the open position.

Turning now descriptively to the drawings, in which similar reference characters denote similar elements throughout the several views, FIGS. 1 through 16 illustrate a roll tarp system 10, which comprises a tarp 20 attached to a side of a container 12, a roller 30 attached to the tarp 20 opposite of the container 12, a rear bracket 40 attached to a rear end of the container 12, a rear inner arm 60 pivotally attached to the rear bracket 40, a rear outer arm 70 pivotally attached to the rear inner arm 60, a front bracket 42 attached to a front end of the container 12, a front inner arm 62 pivotally attached to the front bracket 42, a front outer arm 72 pivotally attached to the front inner arm 62, and an actuator 32 attached to the front inner arm 62 and the roller 30 for rotating the roller 30. A rear spring 50 and a front spring 52 are attached to the brackets respectively for applying a closing bias force upon the inner arms respectively. A front bias member 74 is attached between the front inner arm 62 and the front outer arm 72.

B. Tarp

The tarp 20 may be comprised of any well-known tarp 20 structure commonly utilized to cover various types of containers 12 such as trailers, boxes of trucks and the like. One end of the tarp 20 is attached to a side of the container 12 as best illustrated in FIG. 1 of the drawings. The tarp 20 may be attached to the container 12 via various fastener structures as can be appreciated by one skilled in the art.

C. Roller

Figure 2:
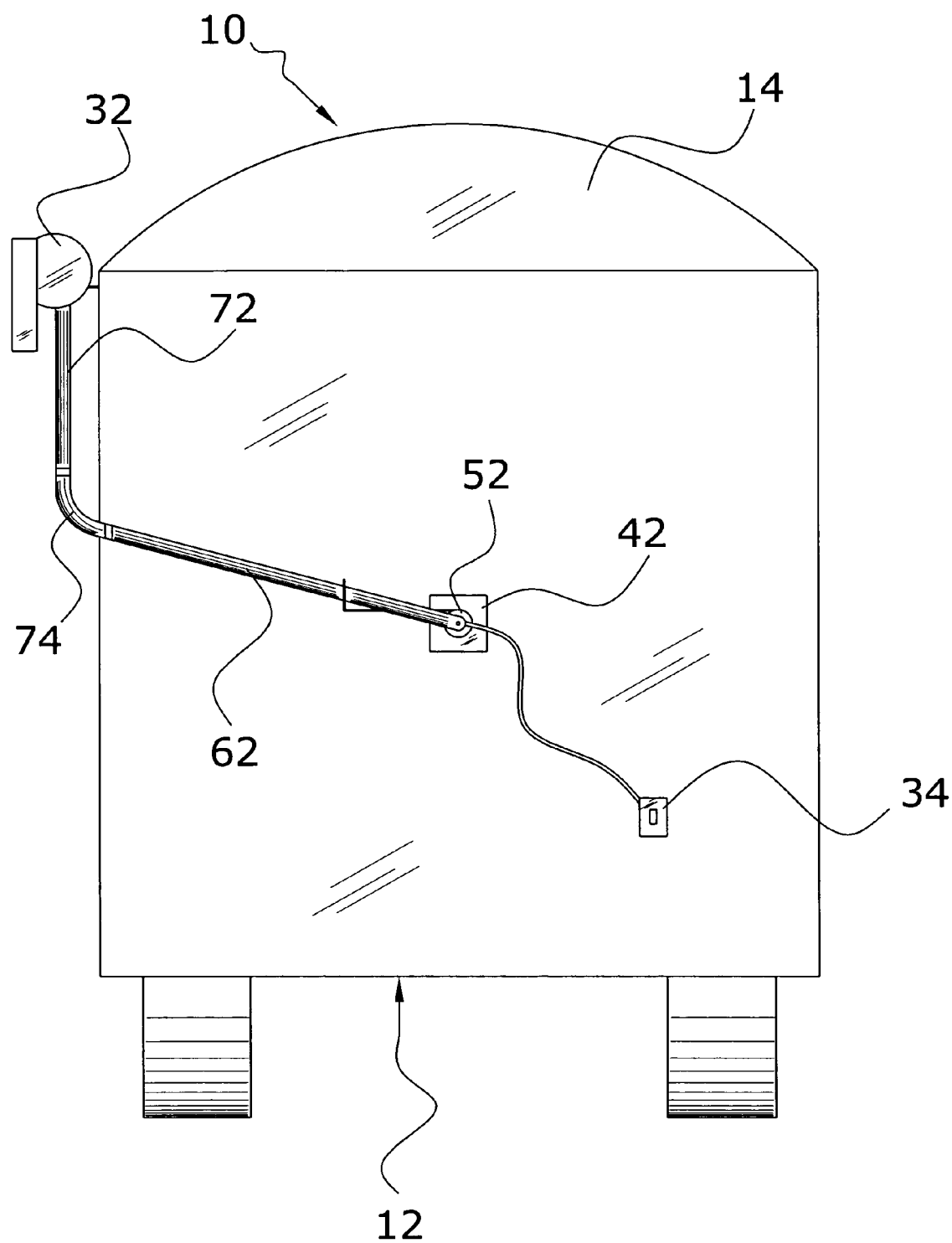
FIG. 2 is a front view of the present invention attached to a container in the open position.
Figure 3:
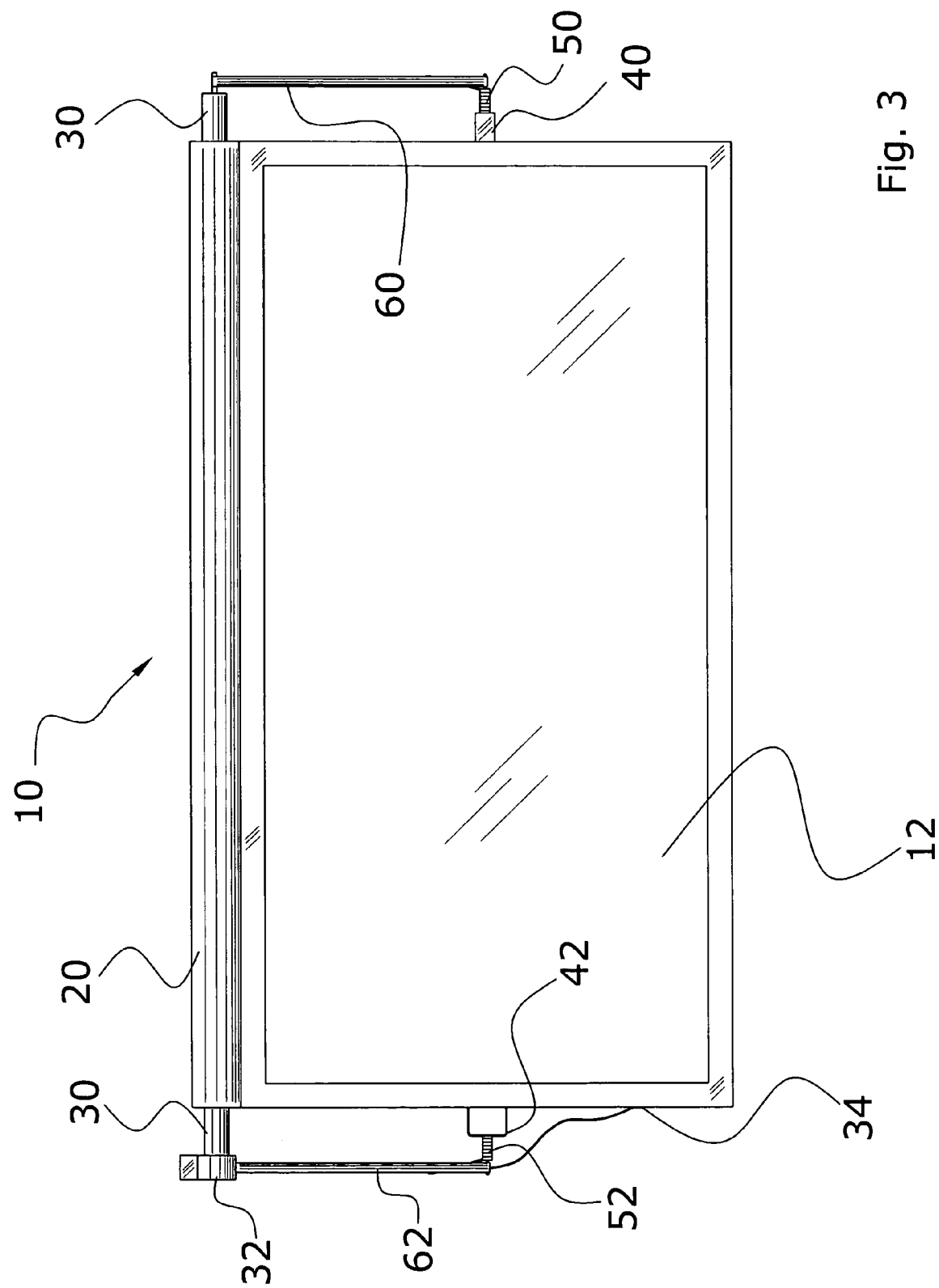
FIG. 3 is a top view of the present invention attached to a container.
Figure 4:
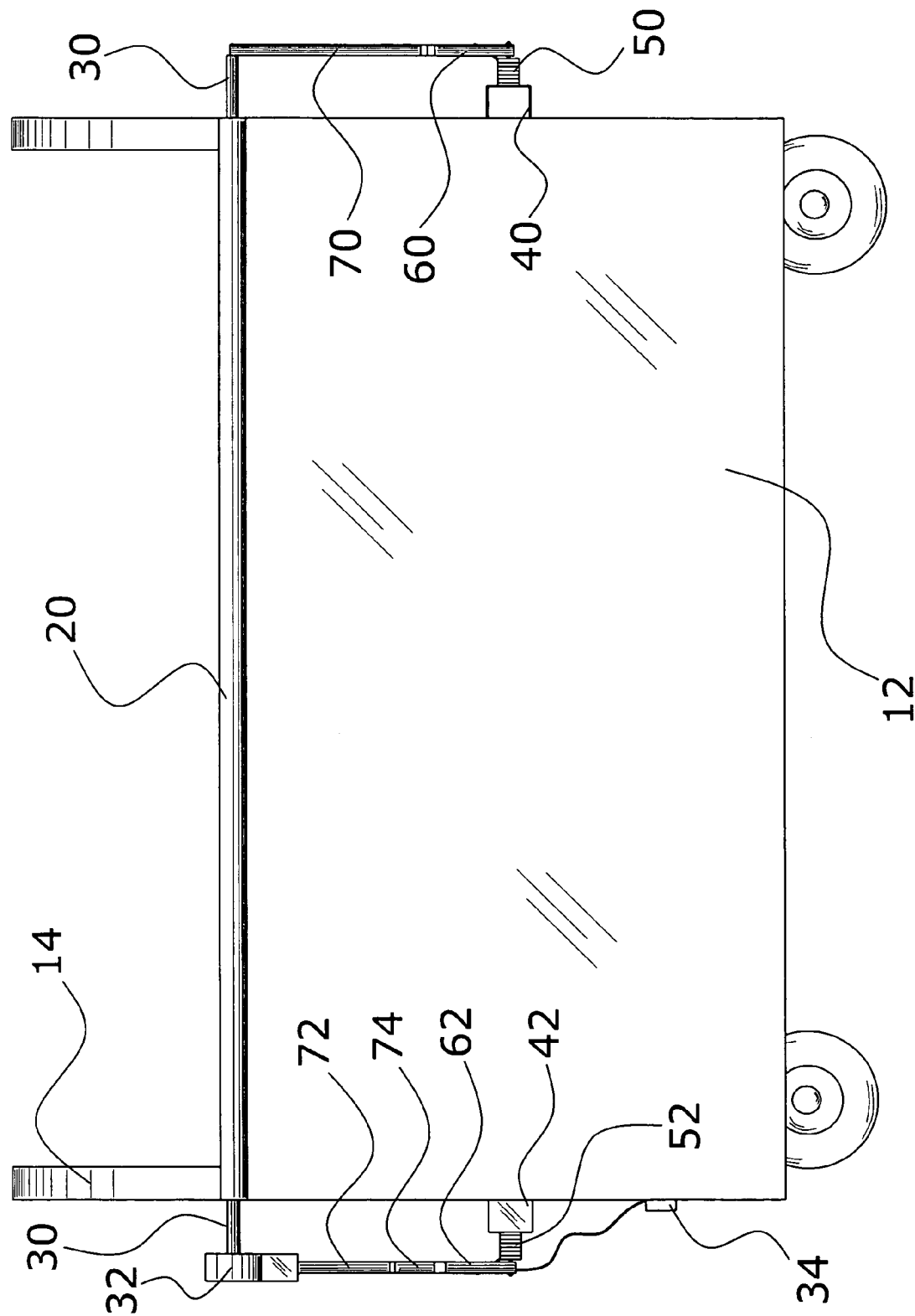
FIG. 4 is a side view of the present invention attached to a container.
Figure 5:
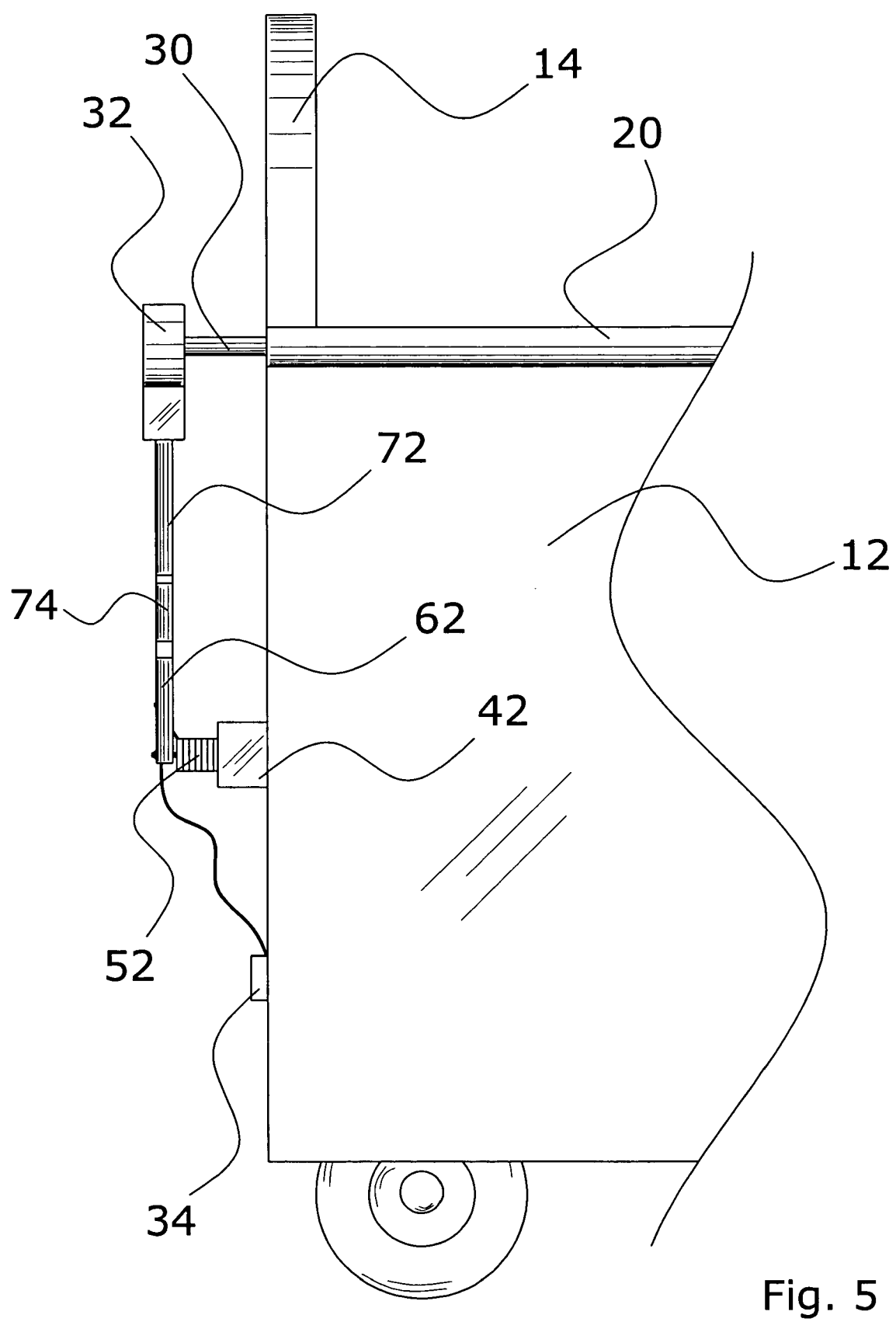
FIG. 5 is a magnified side view of the front inner arm and front outer arm with respect to the container.
Figure 6:
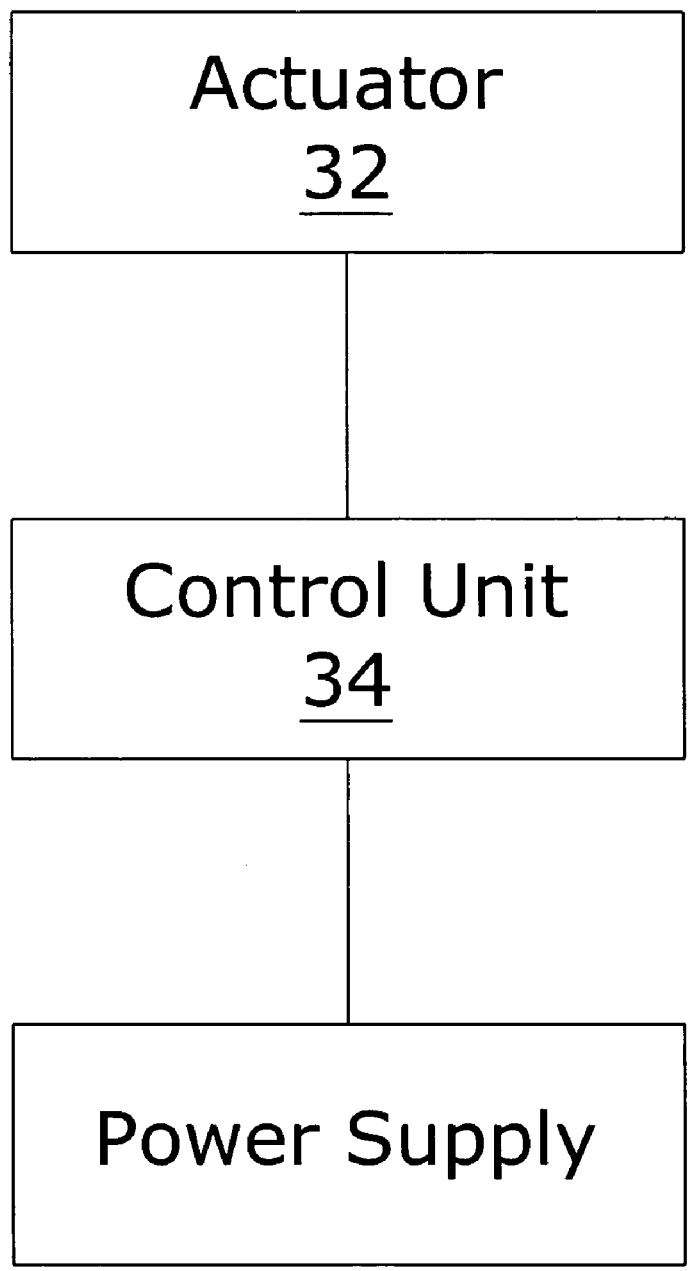
FIG. 6 is a block diagram illustrating the electrical connections of the present invention.

The roller 30 is attached to the tarp 20 opposite of the container 12 as further illustrated in FIGS. 1 and 2 of the drawings. The roller 30 is comprised of an elongated structure capable of extending the entire distance of the container 12 being covered as shown in FIGS. 3 and 4 of the drawings. The roller 30 may be comprised of a solid or tubular structure.

The roller 30 preferably extends past the upper end 14 of the container 12 as best illustrated in FIG. 3 of the drawings. The width of the tarp 20 is preferably less than the length of the roller 30 as further illustrated in FIGS. 3 and 4 of the drawings.

D. Rear Support Structure

As shown in FIGS. 1, 3 and 4 of the drawings, a rear bracket 40 is attached to a rear end of the container 12. The rear bracket 40 may be comprised of various structures that extend outwardly from the container 12.

A rear inner arm 60 is pivotally attached to the rear bracket 40 as further shown in shown in FIGS. 1, 3 and 4 of the drawings. The rear inner arm 60 may be comprised of various elongated structures. A rear outer arm 70 is pivotally attached to the rear inner arm 60 as illustrated in FIG. 1 of the drawings. The rear outer arm 70 may be pivotally attached to the rear inner arm 60 with various types of hinge structures. The rear outer arm 70 may be biased or it may not be biased.

As shown in FIGS. 1, 3 and 4 of the drawings, a rear spring 50 is attached to the rear bracket 40 and the rear inner arm 60 for applying a closing bias force upon the rear inner arm 60. The rear spring 50 is preferably comprised of a torsion spring having an extended arm that engages a portion of the rear inner arm 60 for applying the closing bias force.

FIGS. 8a through 16 illustrate an alternative embodiment of the present invention utilizing a second bias member 66 positioned between the rear outer arm 64 and the roller 30. The second bias member 66 is preferably comprised of a flexible and resilient structure capable of allowing for the door or gate 18 to be opened without significantly moving the roller 30 as illustrated in FIGS. 8b and 9b of the drawings.

Figure 14:
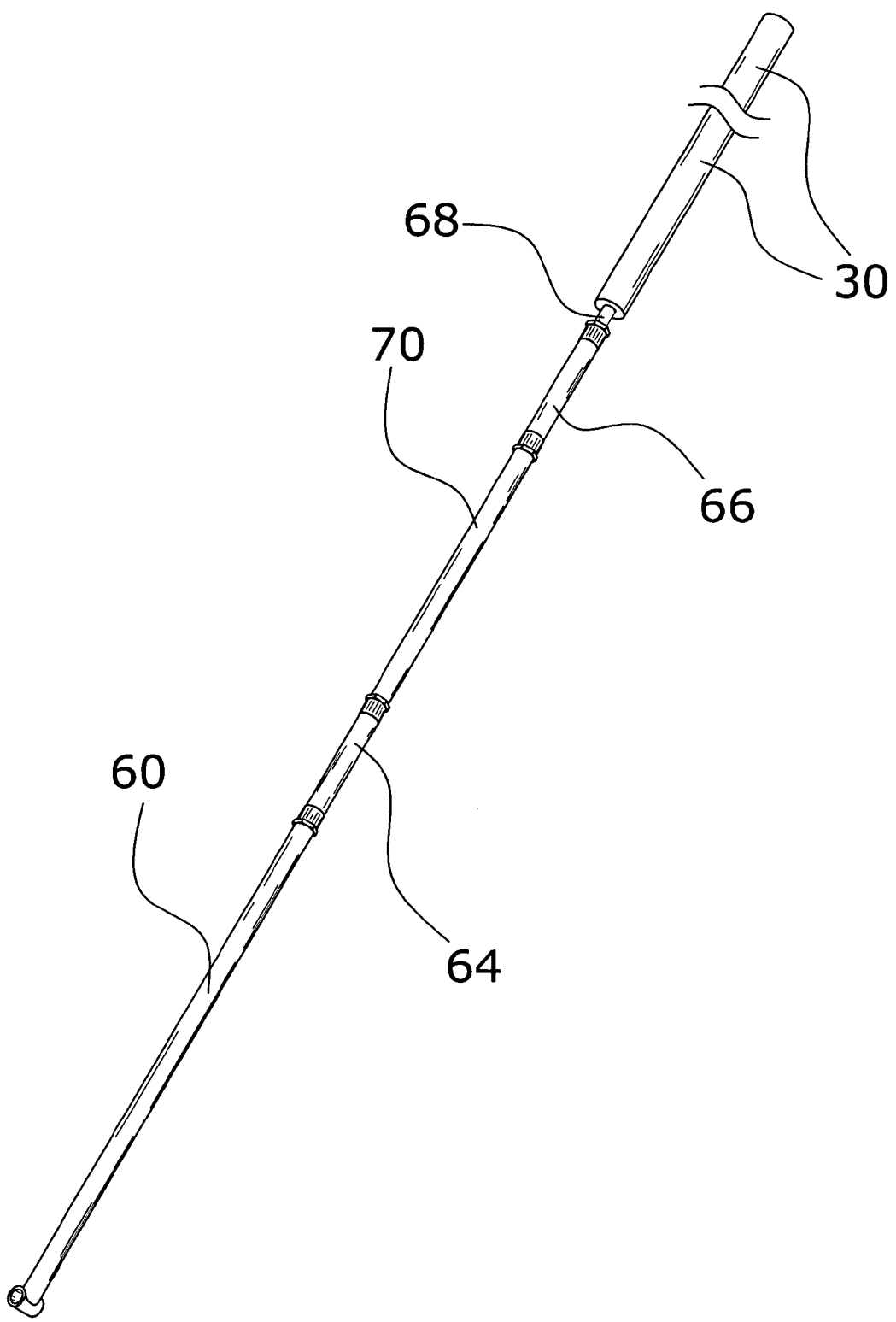
FIG. 14 is an upper perspective view of the rear support portion of the alternative embodiment.
Figure 15:
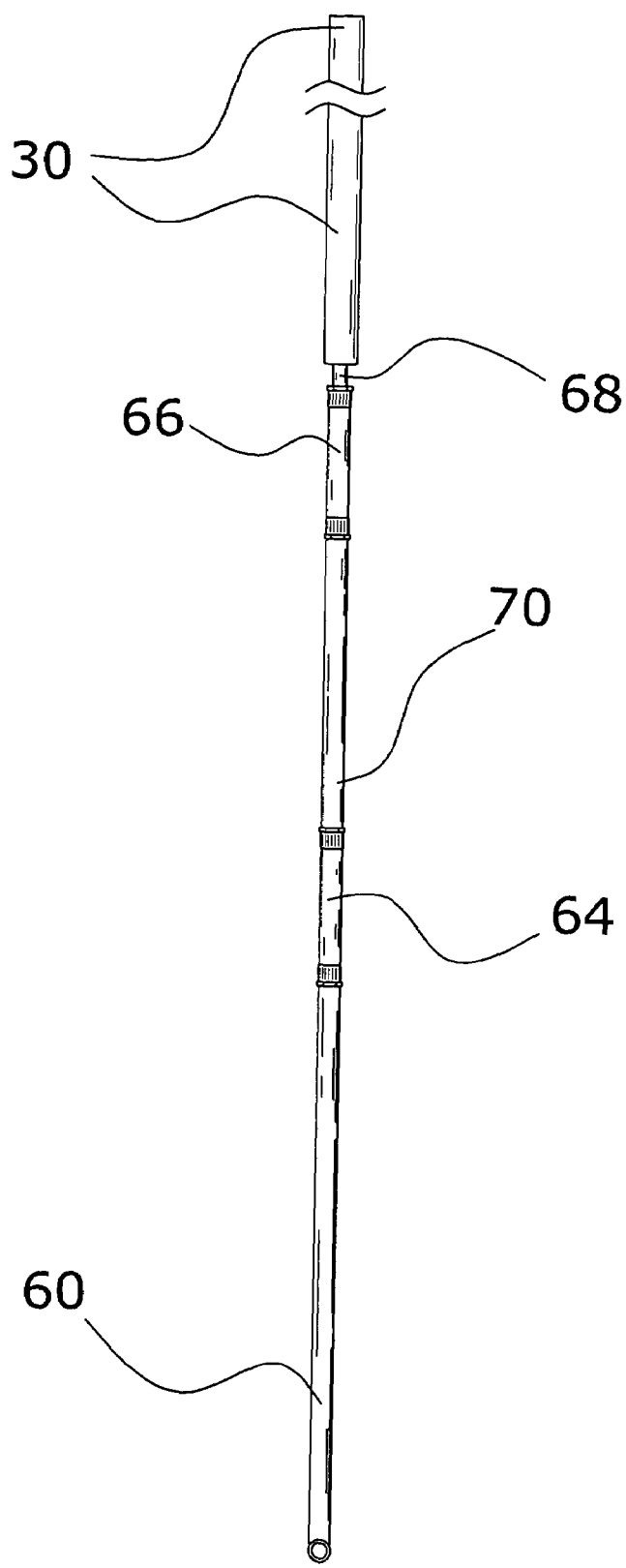
FIG. 15 is a top view of the rear support portion of the alternative embodiment.
Figure 16:
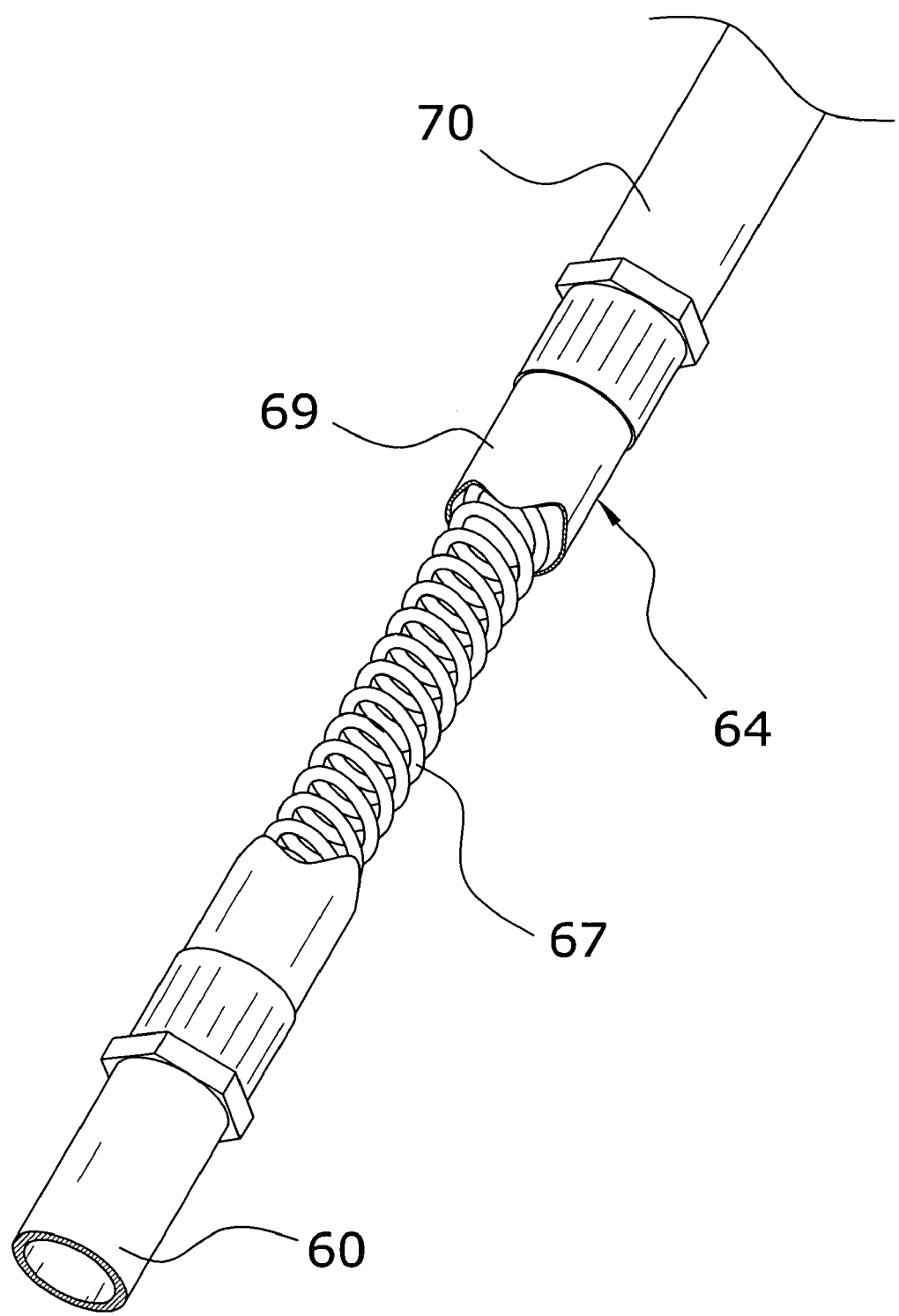
FIG. 16 is a magnified upper perspective view of the first bias member.

The second bias member 66 is preferably rotatably connected to the roller 30 to allow the roller 30 to freely rotated with respect to the second bias member 66 as the roller 30 is driven from the opposite end thereof. An axle 68 preferably extends from a distal portion of the second bias member 66, wherein the axle 68 rotatably engages the roller 30 as illustrated in FIGS. 14 and 15 of the drawings. A bearing structure is preferably utilized between the axle 68 and the roller 30 to facilitate efficient rotation of the roller 30 with respect to the axle 68. Various structures may be utilized to construct the axle 68 to rotatably support the roller 30.

The second bias member 66 is preferably comprised of a resilient cover 69 (e.g. rubber tube) surrounding a compression spring 67. Alternatively, the second bias member 66 is comprised of a compression spring 67 without a cover or a rubber tube without a compression spring.

E. Front Support Structure

As shown in FIGS. 2, 3, 4, 5 and 7a through 7d of the drawings, a front bracket 42 is attached to a front end of the container 12. The front bracket 42 may be comprised of various structures that extend outwardly from the container 12.

A front inner arm 62 is pivotally attached to the front bracket 42 as further shown in shown in FIGS. 2, 3, 4, 5 and 7a through 7d of the drawings. The front inner arm 62 may be comprised of various elongated structures similar to the rear inner arm 60. A front outer arm 72 is pivotally attached to the front inner arm 62 as illustrated in FIG. 1 of the drawings.

Figure 7A:
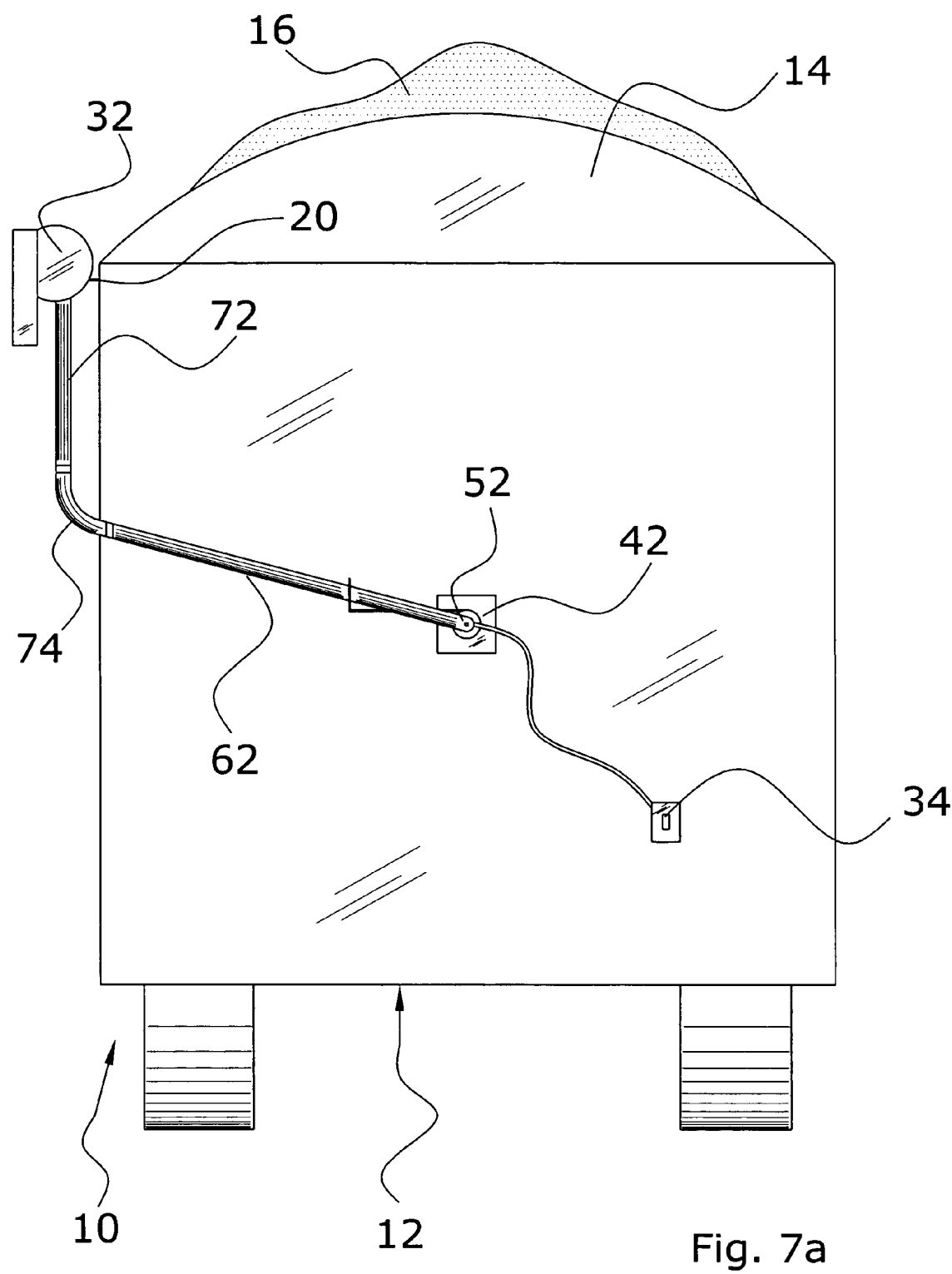
FIG. 7a is a front view of the present invention attached to a container with a heaped load with the tarp in the open position.

A front bias member 74 is preferably attached between the front inner arm 62 and the front outer arm 72. The front bias member 74 is preferably comprised of a flexible tube (e.g. rubber tube) surrounding a compression spring. Alternatively, the front bias member 74 is comprised of a compression spring without a cover or a rubber tube without a compression spring. The front bias member 74 is preferably concentrically attached between the front inner arm 62 and the front outer arm 72 as best illustrated in FIG. 7c of the drawings. The front bias member 74 is flexible while attempting to retain the front inner arm 62 and the front outer arm 72 in a concentrically aligned position.

As shown in FIGS. 2 through 4 of the drawings, a front spring 52 is attached to the front bracket 42 and the front inner arm 62 for applying a closing bias force upon the front inner arm 62. The front spring 52 is preferably comprised of a torsion spring having an extended arm that engages a portion of the front inner arm 62 for applying the closing bias force.

F. Actuator

The actuator 32 is attached to the front outer arm 72 and the roller 30 for rotating the roller 30 as shown in FIGS. 2 through 5 of the drawings. The actuator 32 may be comprised of a hand crank or an electric motor which are well known in the art of roll covers.

If an electric motor is used to construct the actuator 32, a control unit 34 is preferably in communication with the actuator 32 for controlling the rotation of the roller 30. The control unit 34 may be comprised of a simple switch or other controller 30 device. The control unit 34 is electrically connected to any type of conventional power supply (e.g. battery, vehicle electrical system). The control unit 34 is preferably electrical connected to the actuator 32 for controlling and providing electrical power to the actuator 32.

G. Operation of Invention

In use, the present invention is first attached to a conventional container 12 (e.g. trailer, box of a truck, etc.) in various manners that are understood by one skilled in the art. After the present invention is installed upon the container 12, the container 12 is then filled with a load 16 (e.g. grain, gravel, etc.) as shown in FIG. 7a. As often occurs, the load 16 extends above the upper end 14 of the container 12 as further shown in FIG. 7a where the benefits of the present invention are best illustrated.

Figure 7B:
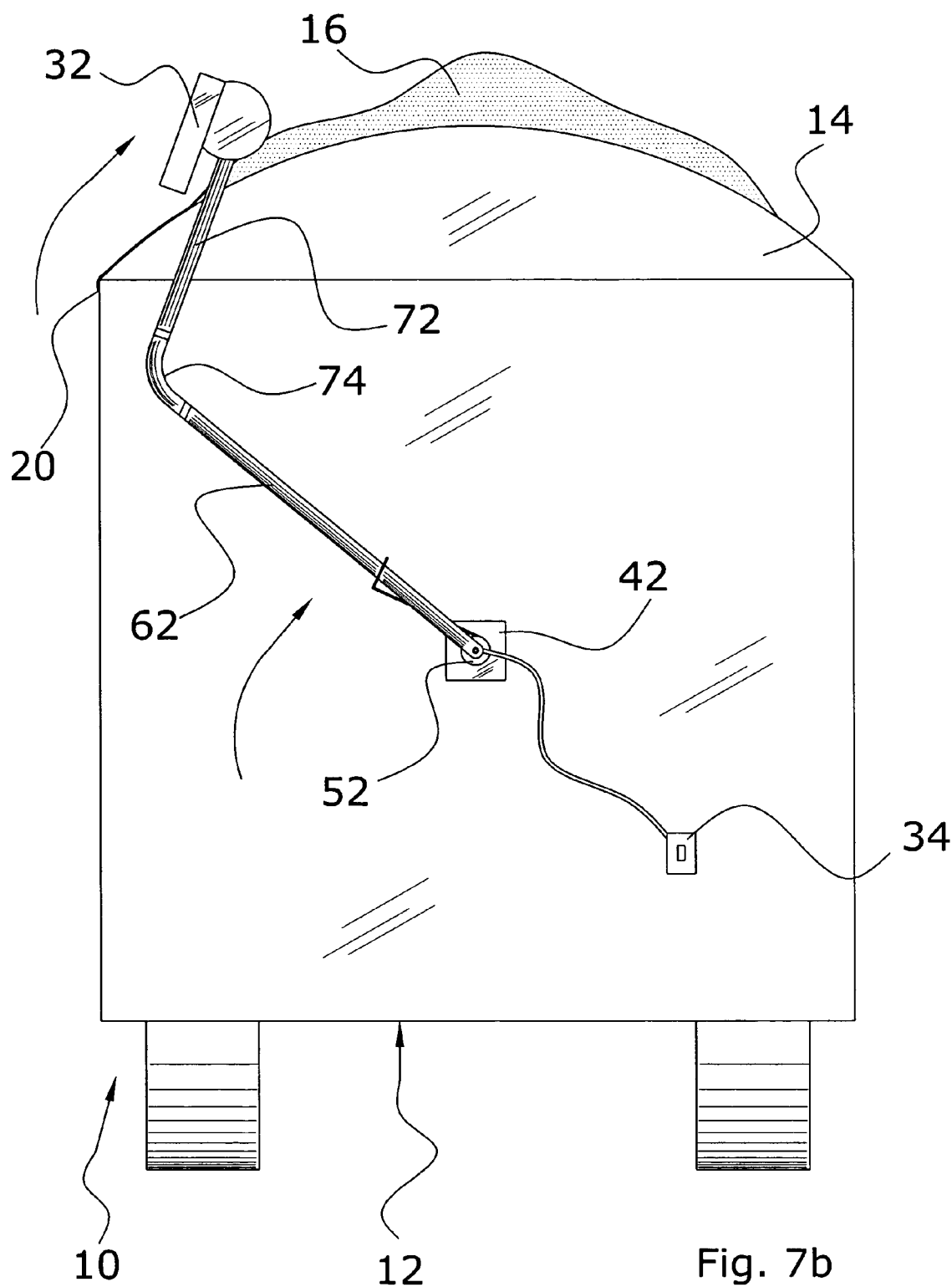
FIG. 7b is a front view of the present invention attached to a container with a heaped load with the tarp in the partially open position.
Figure 7C:
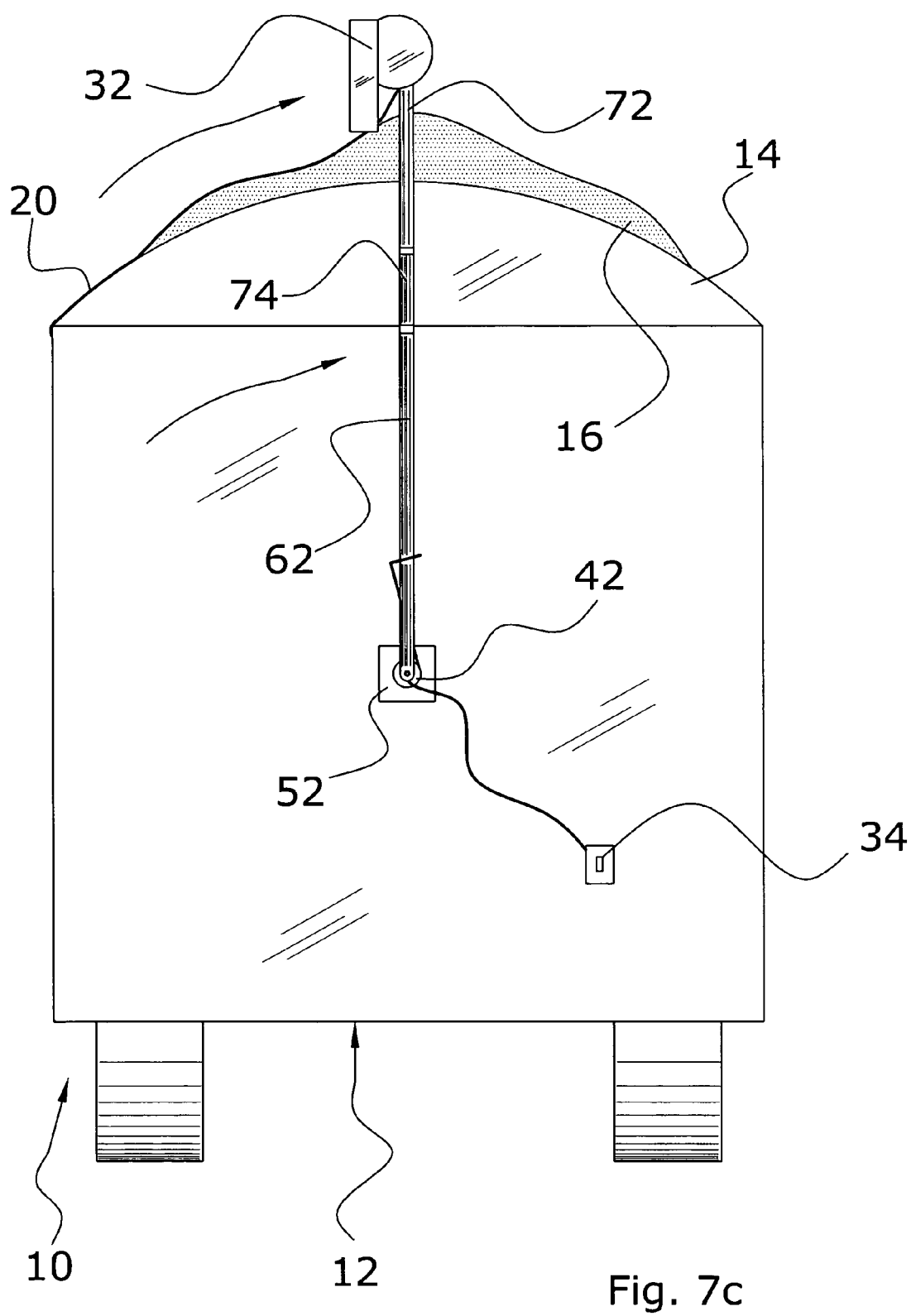
FIG. 7c is a front view of the present invention attached to a container with a heaped load with the tarp approximately half ways to being in the closed position.
Figure 7D:
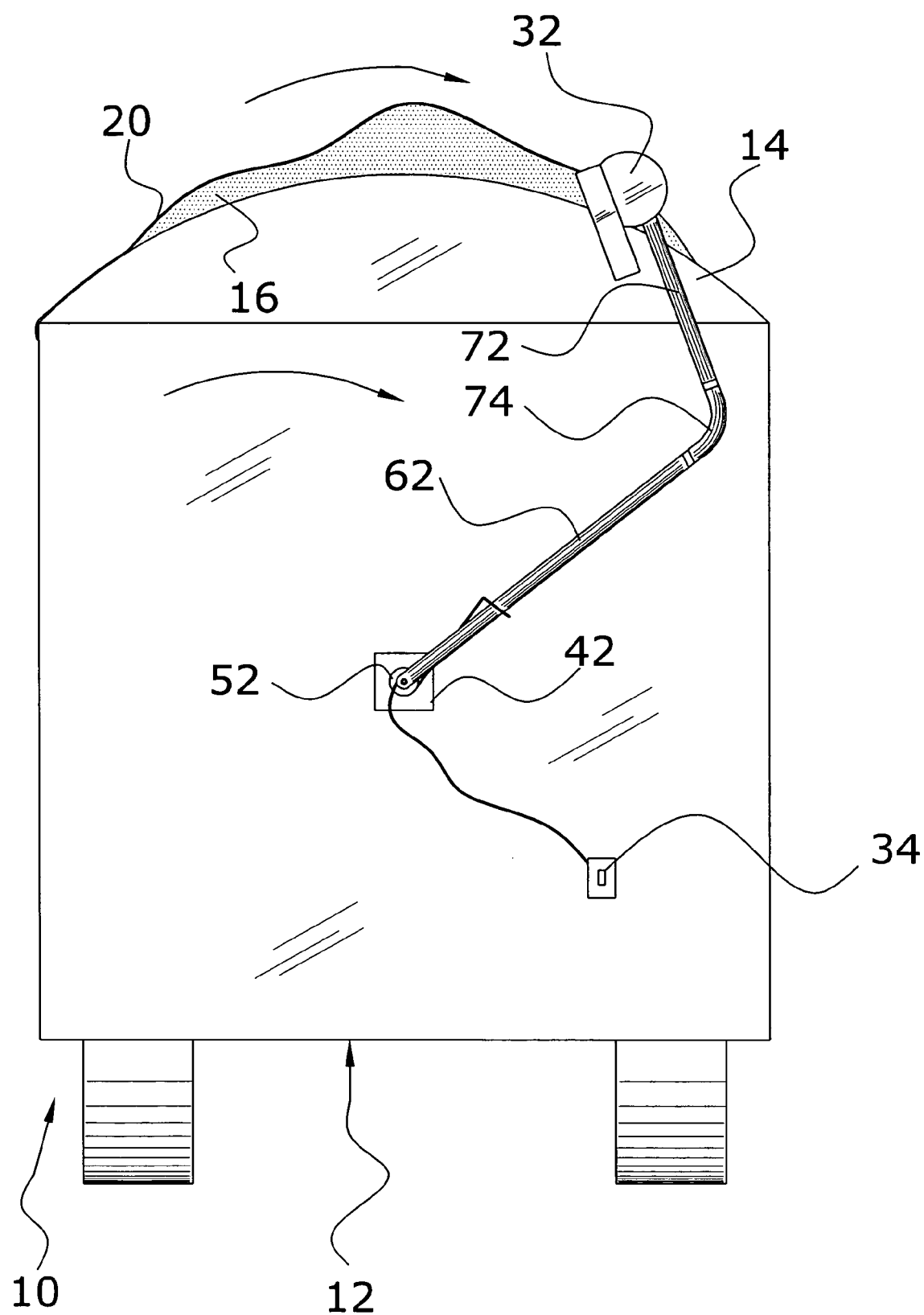
FIG. 7d is a front view of the present invention attached to a container with a heaped load with the tarp approaching the closed position.

To close the tarp 20 upon the container 12 and the load 16, the control unit 34 is manipulated thereby activating the actuator 32 to roll the roller 30 in a first rotation as shown in FIG. 7b. Alternatively, if a hand crank is utilized for the actuator 32 the user would simply manipulate the actuator 32 manually as is well known in the art. As the roller 30 is rotated in the first direction, roller 30 rolls along the upper edge of the container 12 in a closing direction. The springs 50, 52 apply the closing bias force to the inner arms 60, 62 to also facilitate the closing movement of the roller 30 as shown in FIG. 7b of the drawings. The rotation of the roller 30 in the first rotation causes the release of the tarp 20 from the roller 30 which allows the roller 30 to move towards the closed position as encouraged by the springs 50, 52 and the front bias member 74.

Figure 7E:
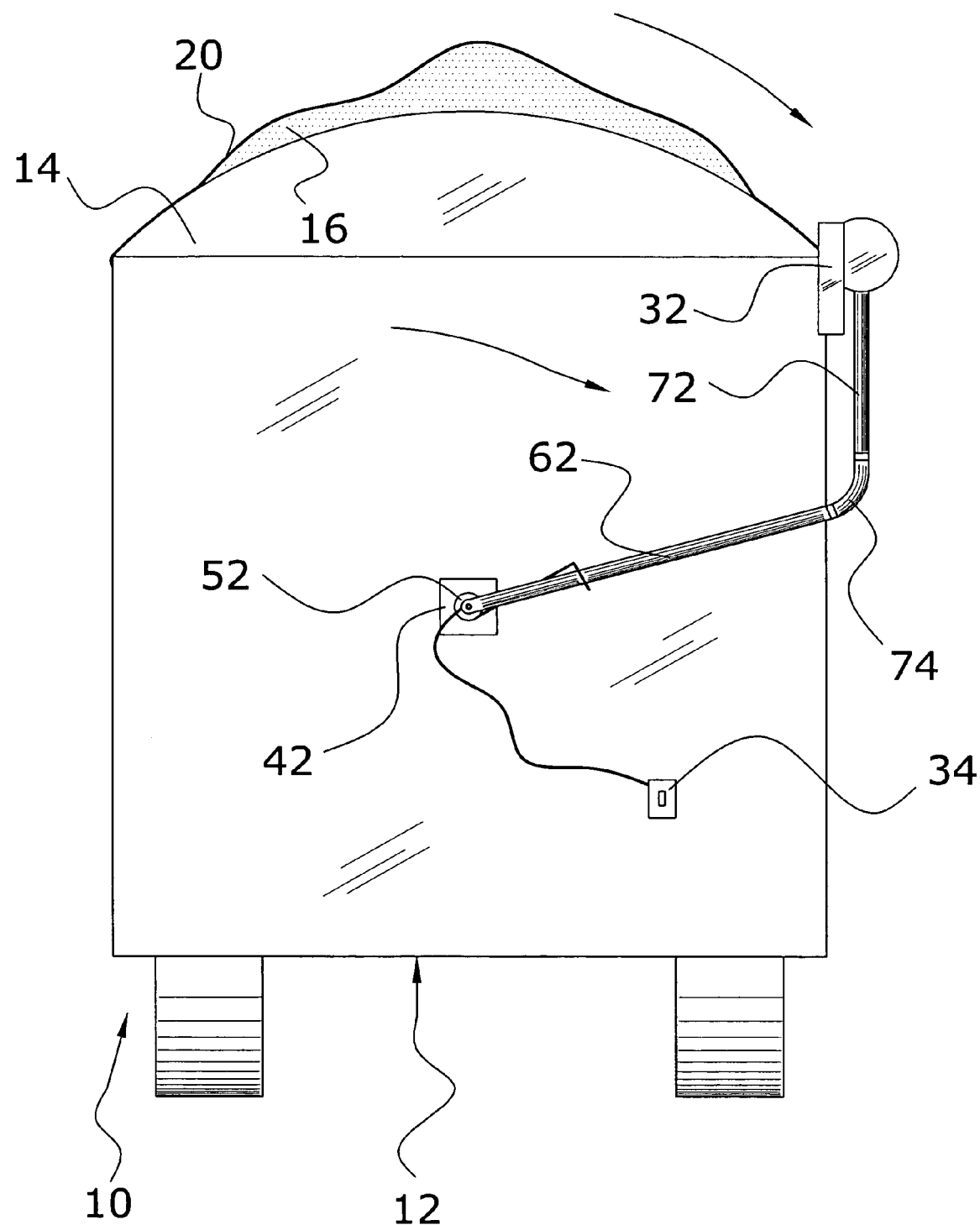
FIG. 7e is a front view of the present invention attached to a container with a heaped load with the tarp in the closed position.
Figure 8A:
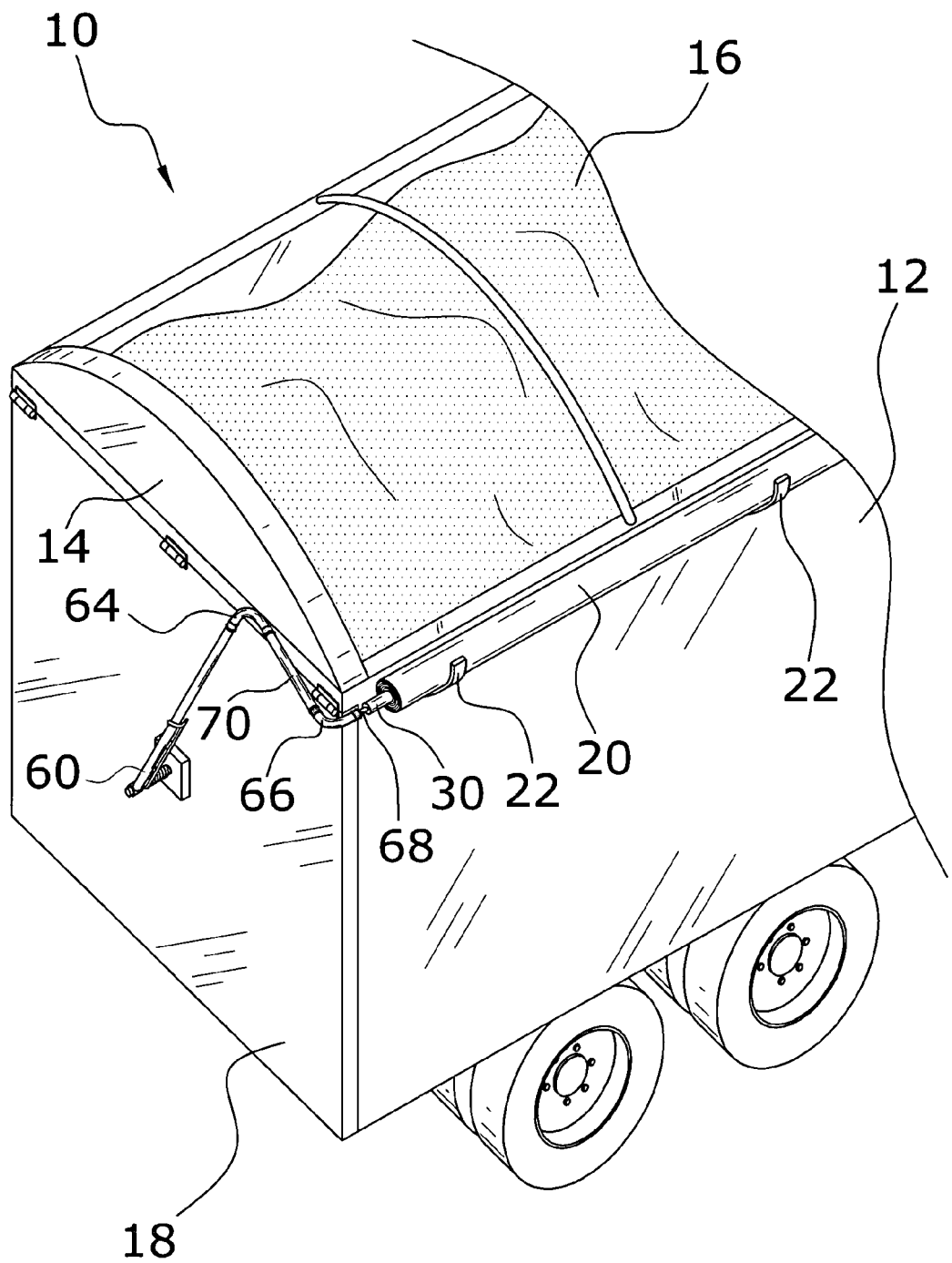
FIG. 8a is an upper perspective view of an alternative embodiment of the present invention with a second bias member positioned between the roller and a rear outer arm attached to a container having a rear gate.
Figure 8B:
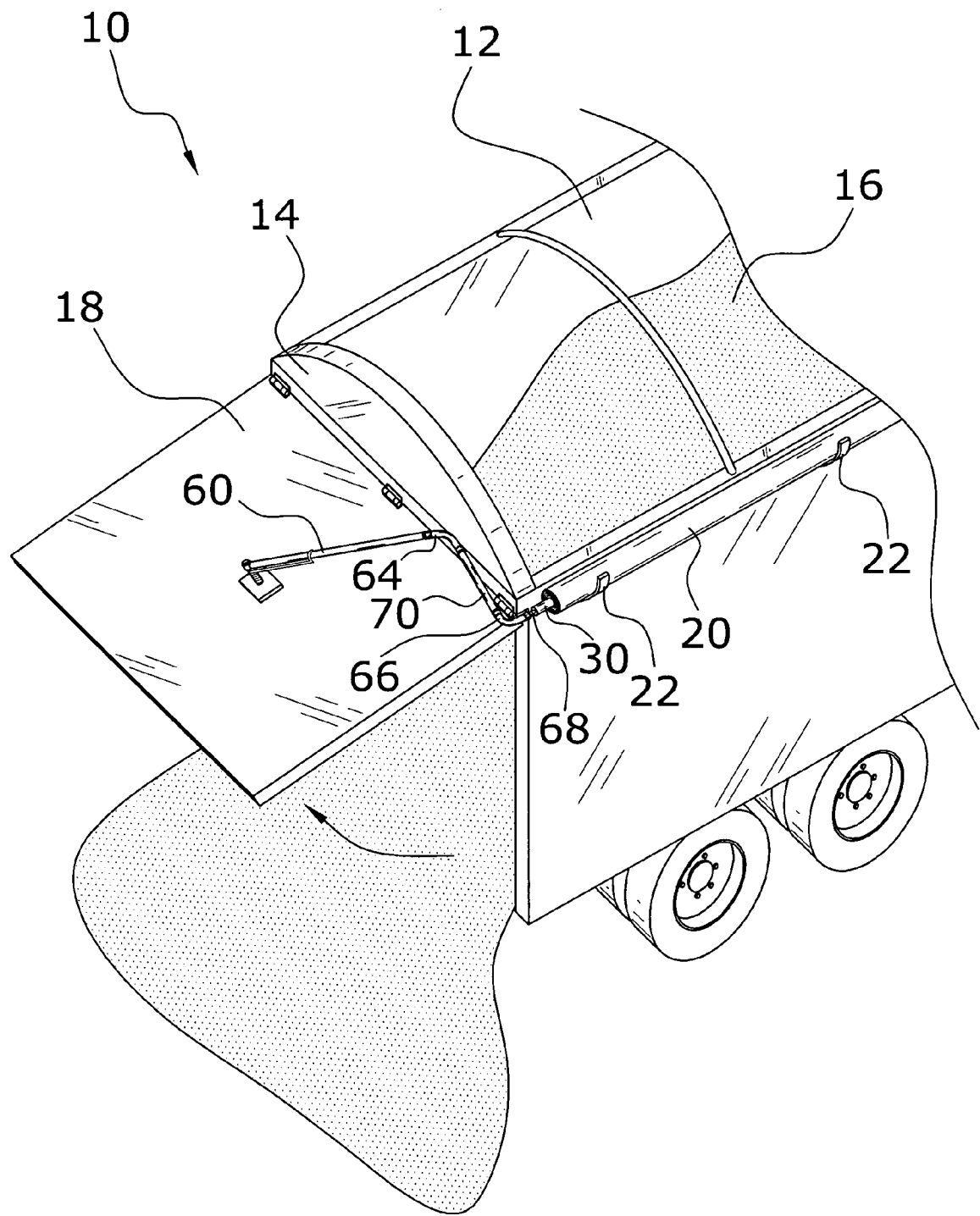
FIG. 8b is an upper perspective view of the alternative embodiment with the rear gate opened to unload the load.
Figure 9A:
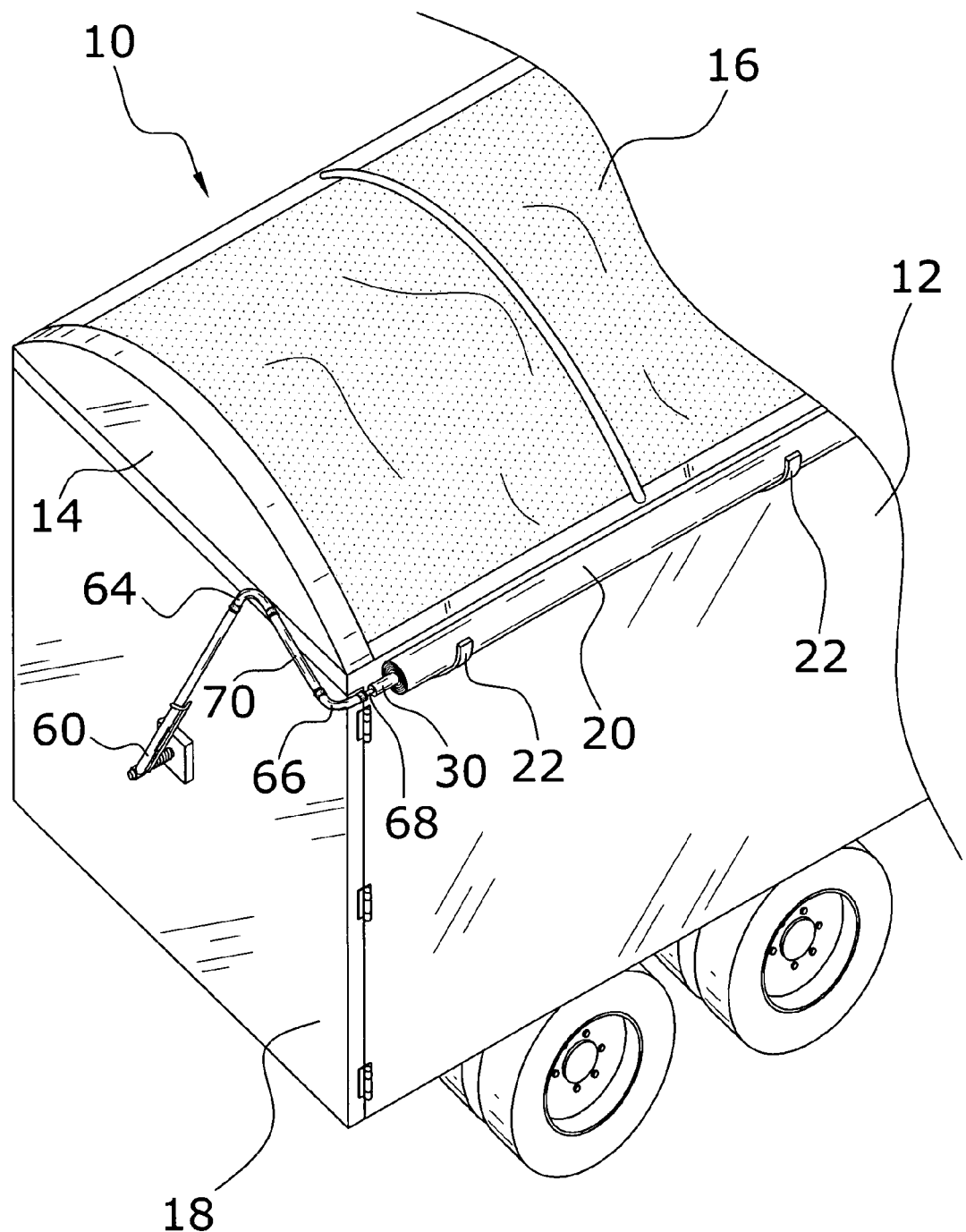
FIG. 9a is an upper perspective view of an alternative embodiment of the present invention with a second bias member positioned between the roller and a rear outer arm attached to a container having a rear door.
Figure 9B:
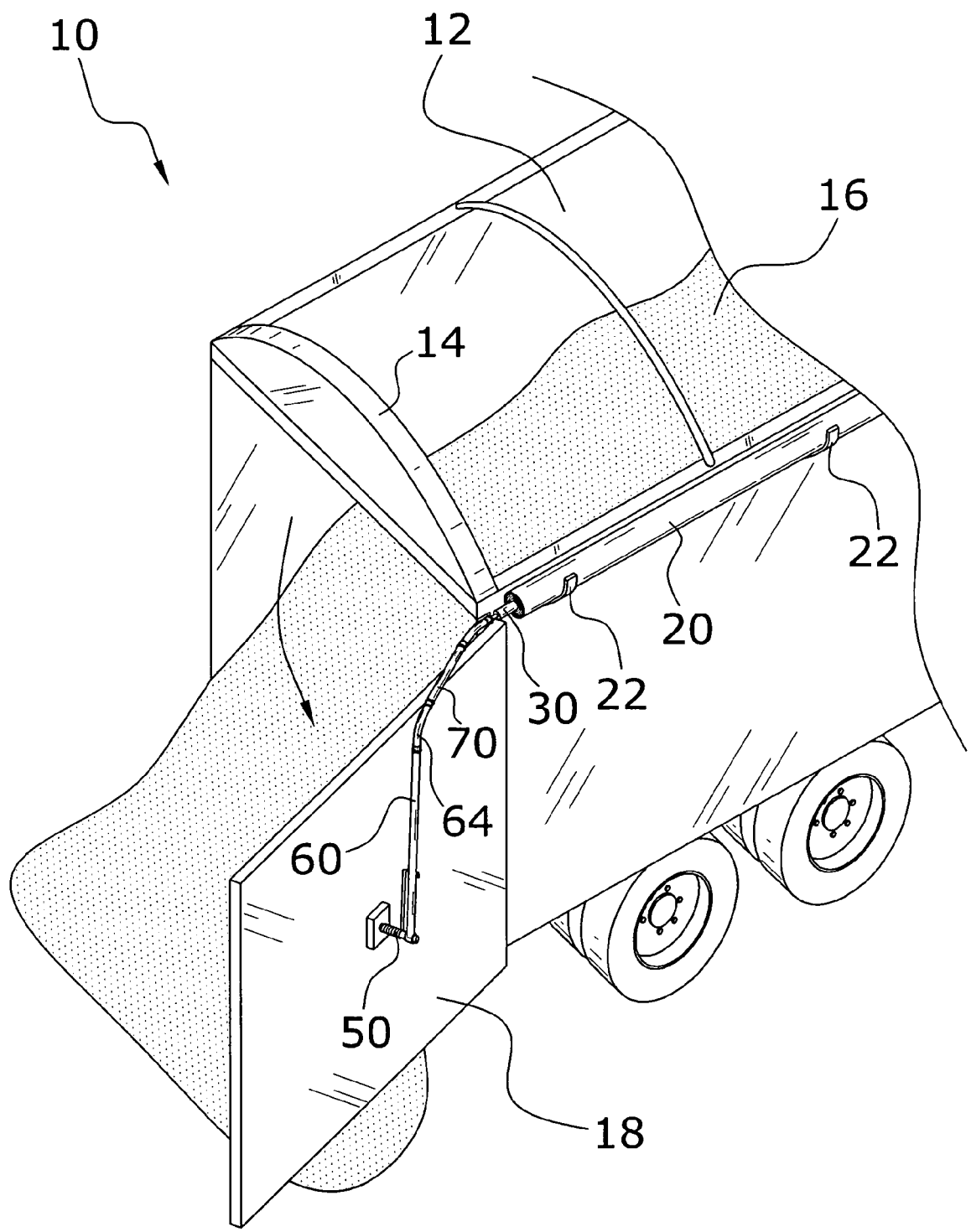
FIG. 9b is an upper perspective view of the alternative embodiment with the rear door opened to unload the load.
Figure 10:
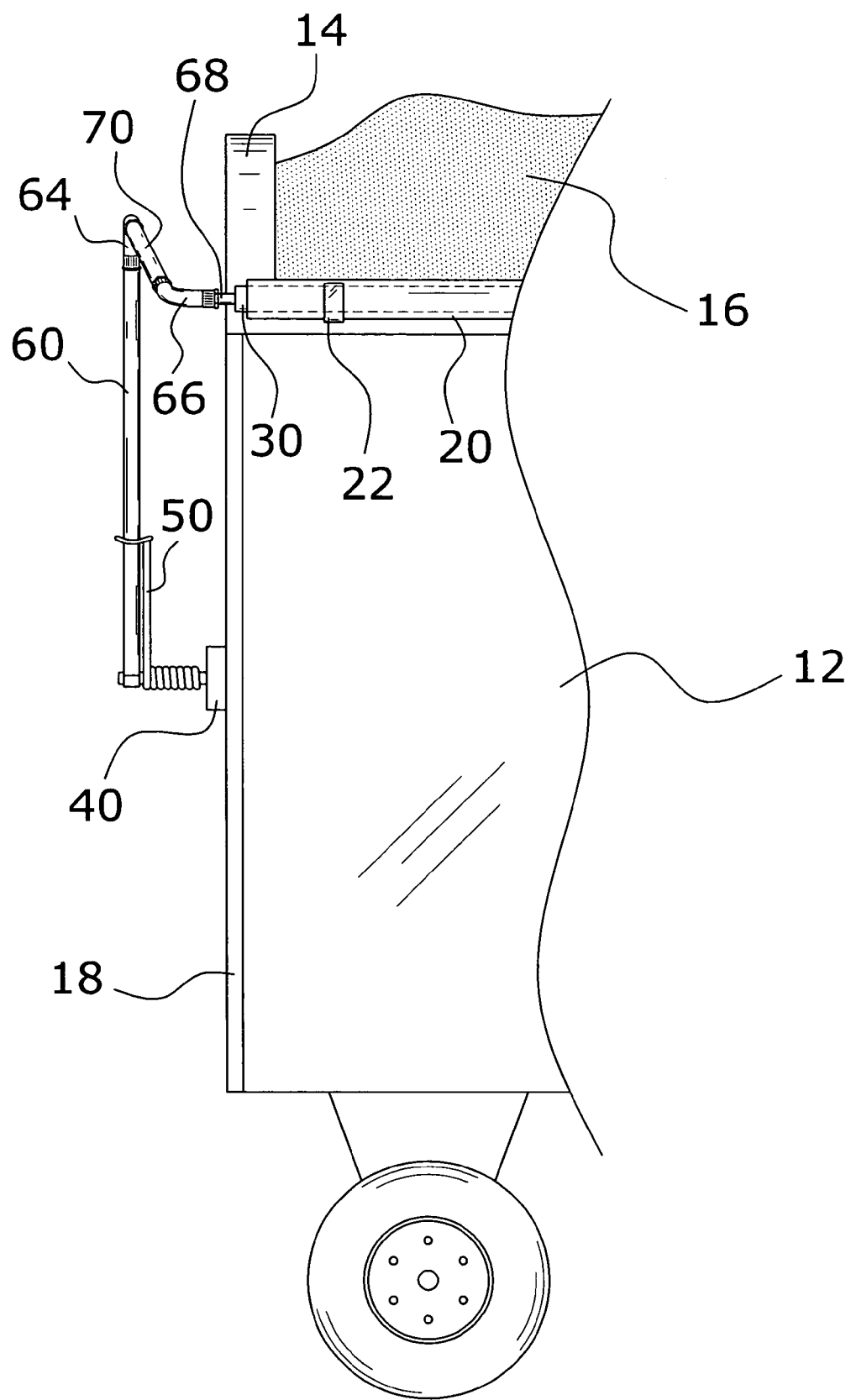
FIG. 10 is a side view of the rear portion of the alternative embodiment attached to a container.
Figure 11:
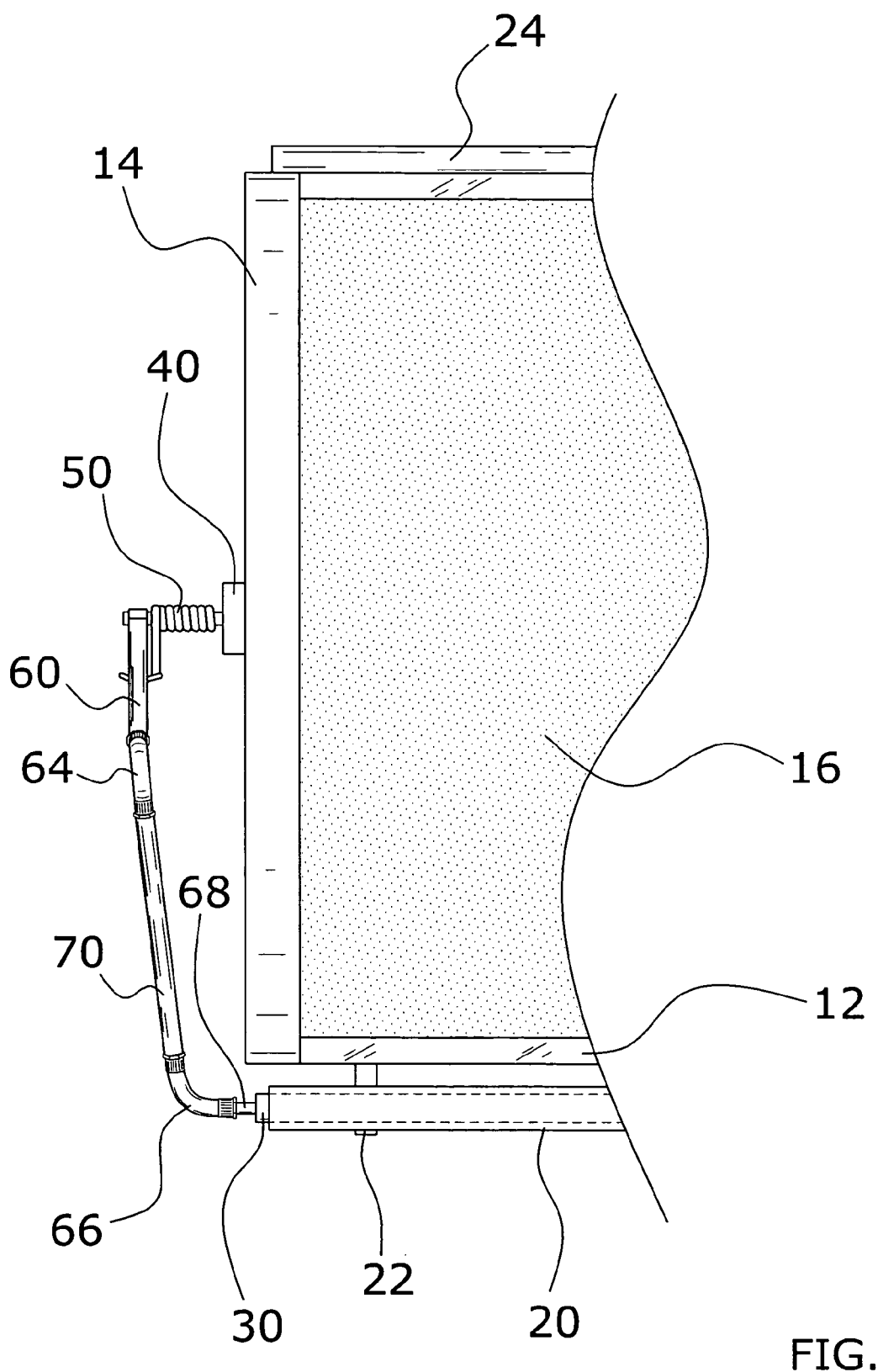
FIG. 11 is a top view of the rear portion of the alternative embodiment attached to a container.
Figure 12:
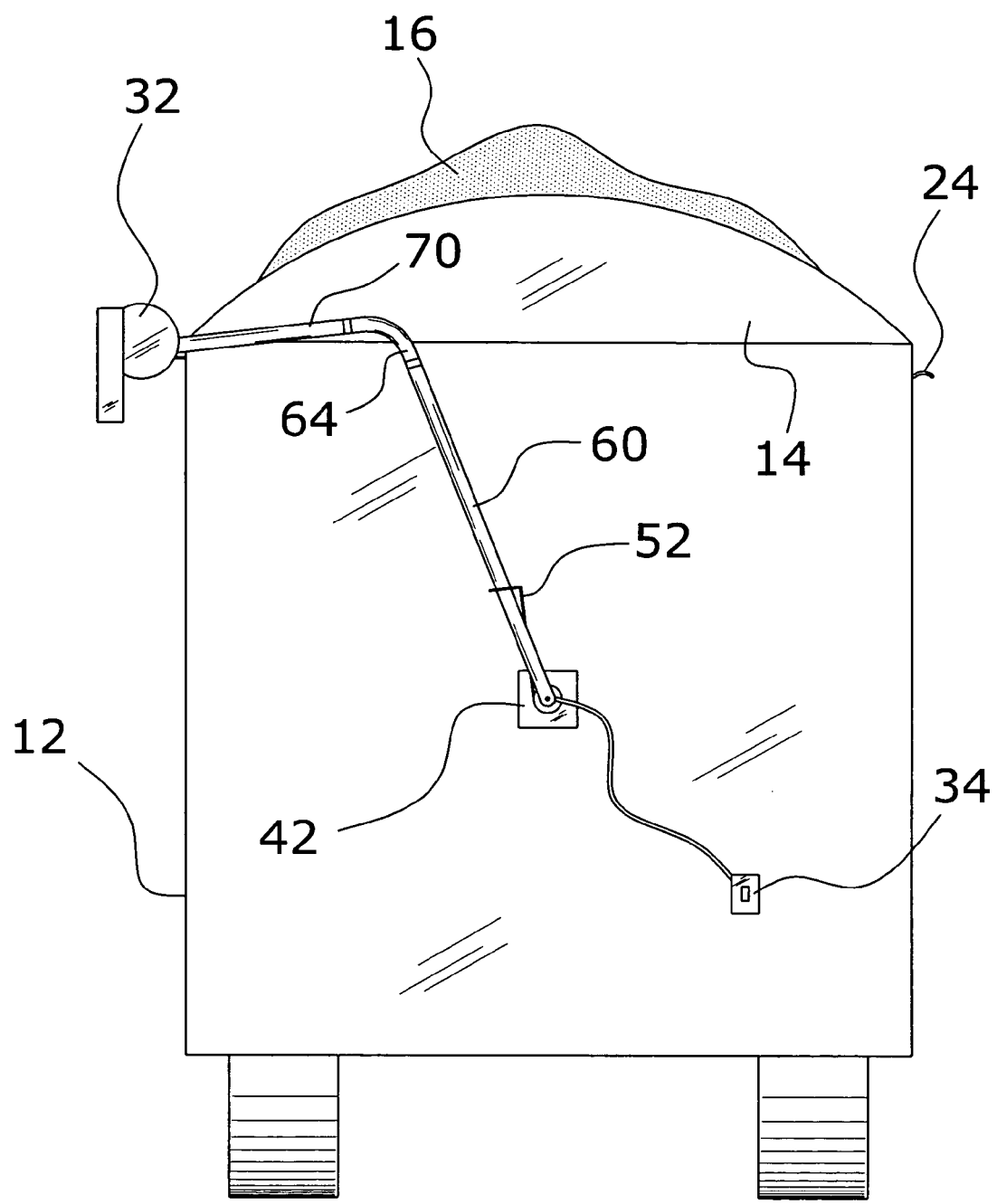
FIG. 12 is a front view of the front portion of the alternative embodiment attached to a container.
Figure 13A:
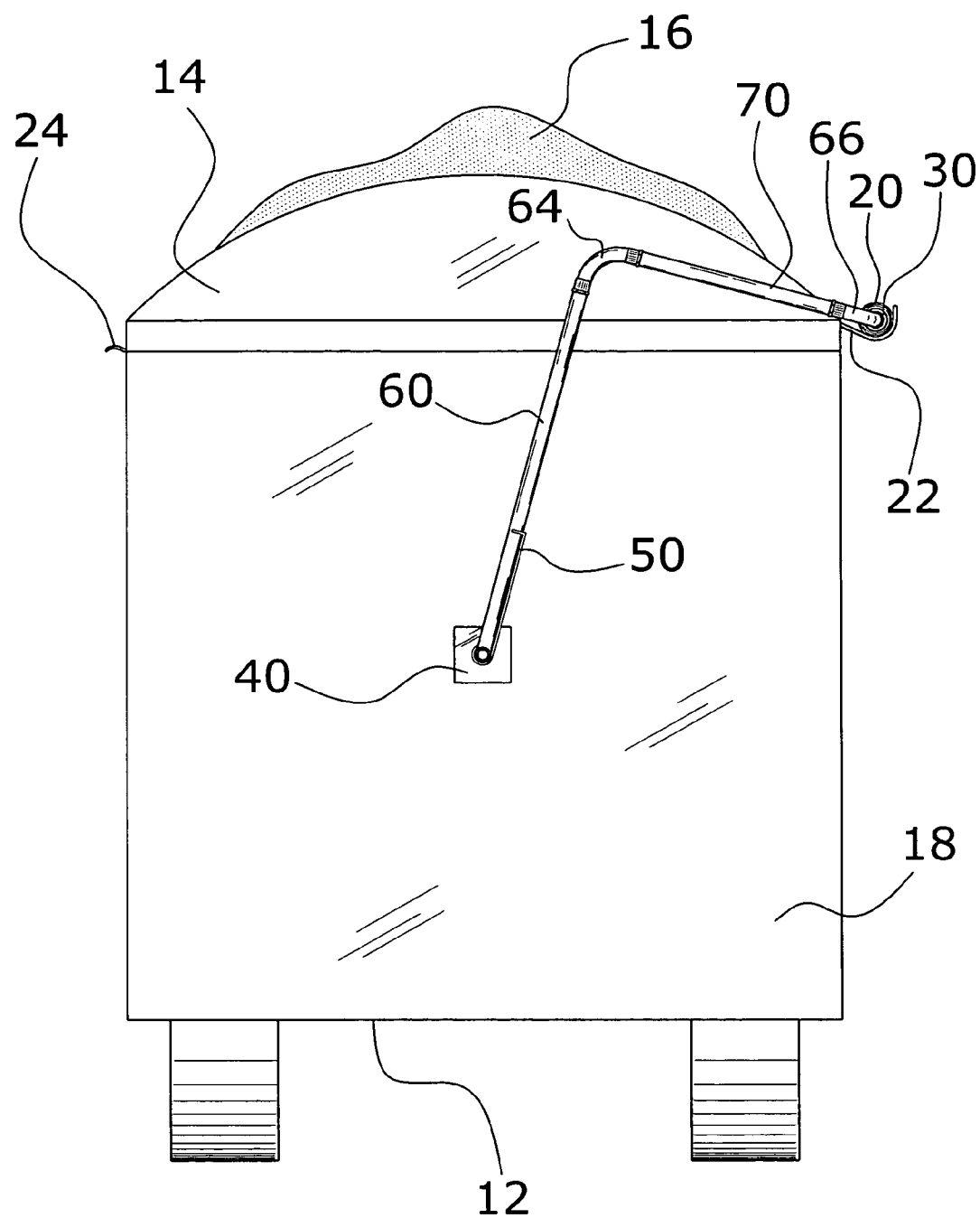
FIG. 13a is a rear view of the alternative embodiment in the open position.
Figure 13B:
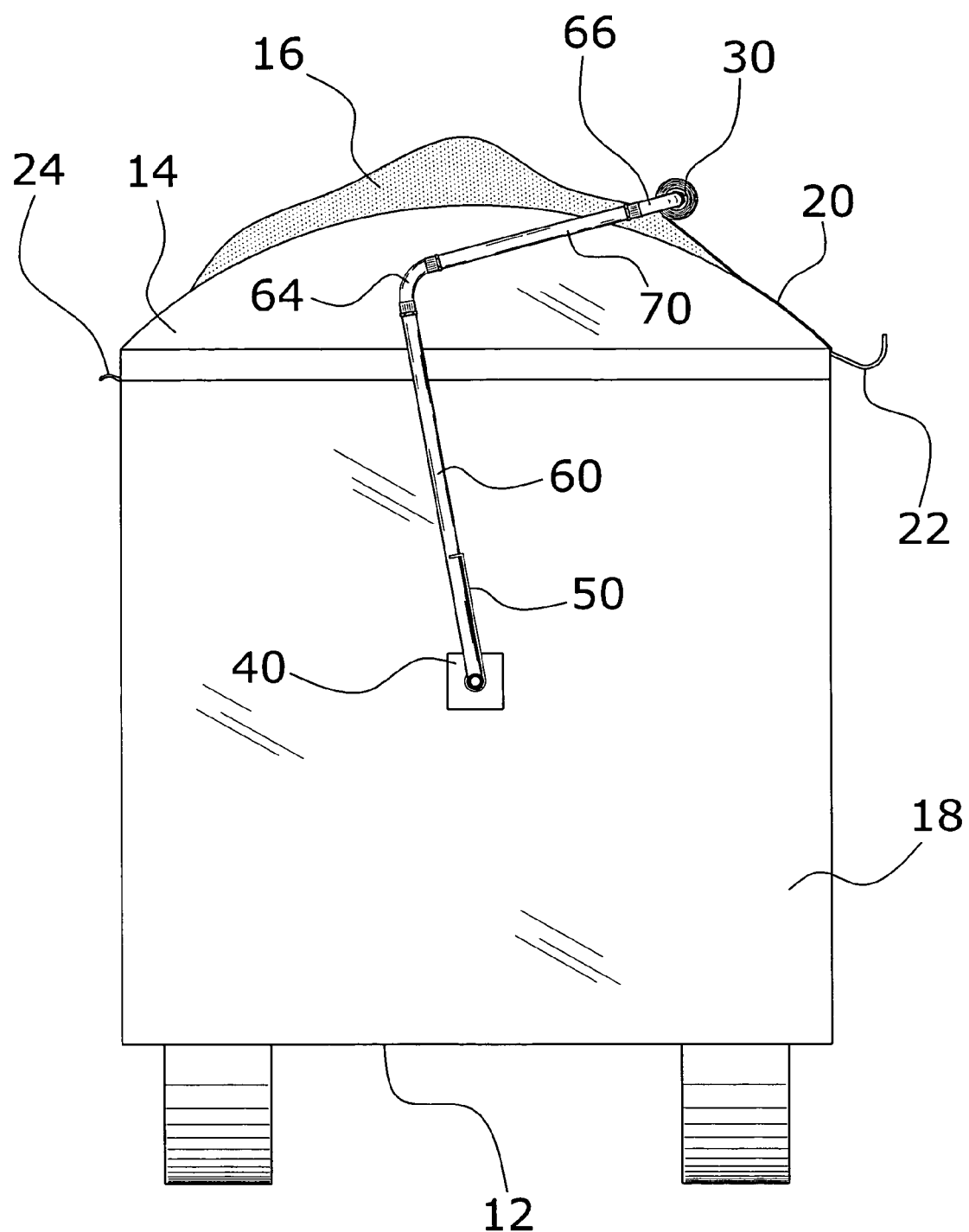
FIG. 13b is a rear view of the alternative embodiment in the partially open position.
Figure 13C:
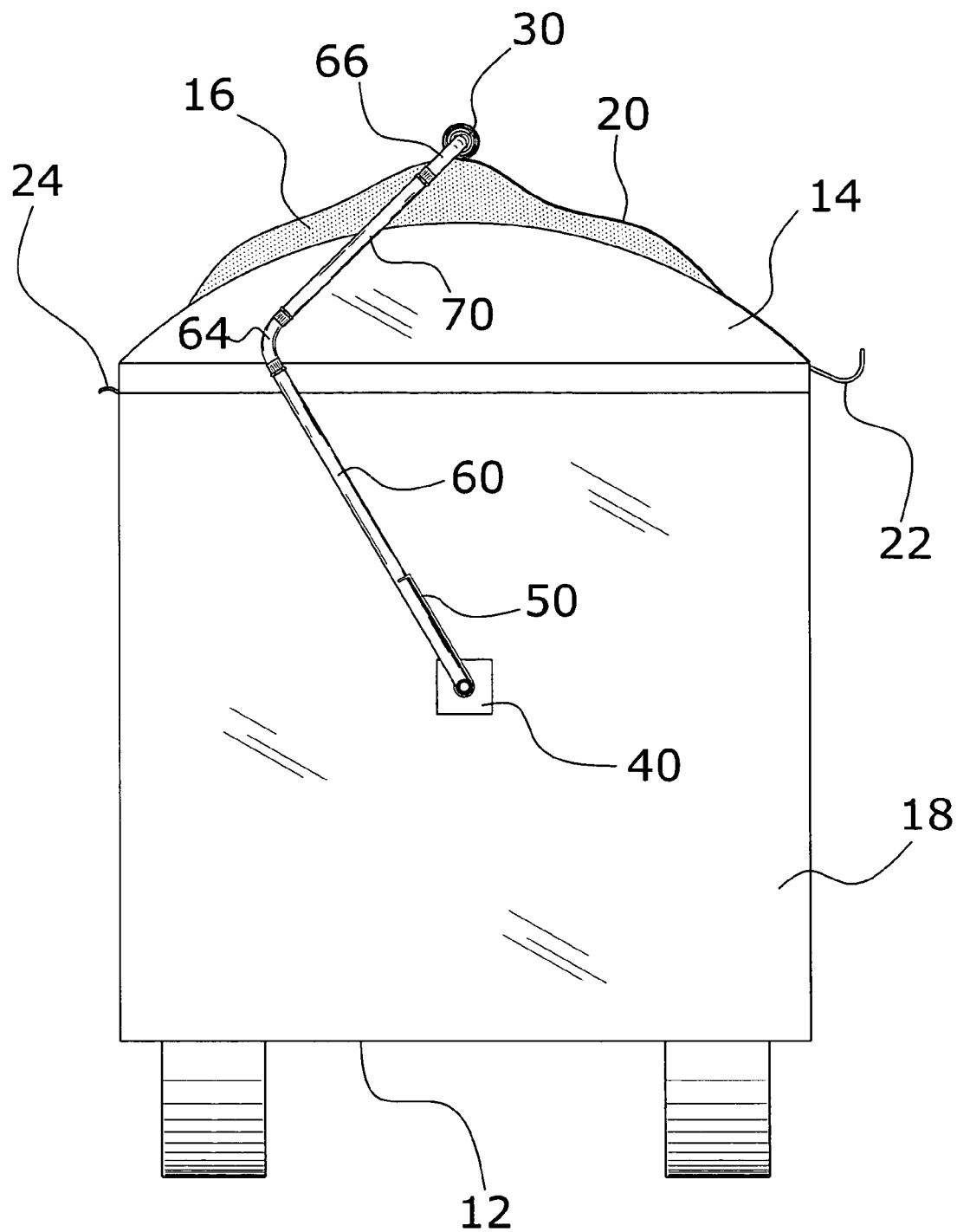
FIG. 13c is a rear view of the alternative embodiment in the partially open position with the roller positioned approximately mid-way.
Figure 13D:
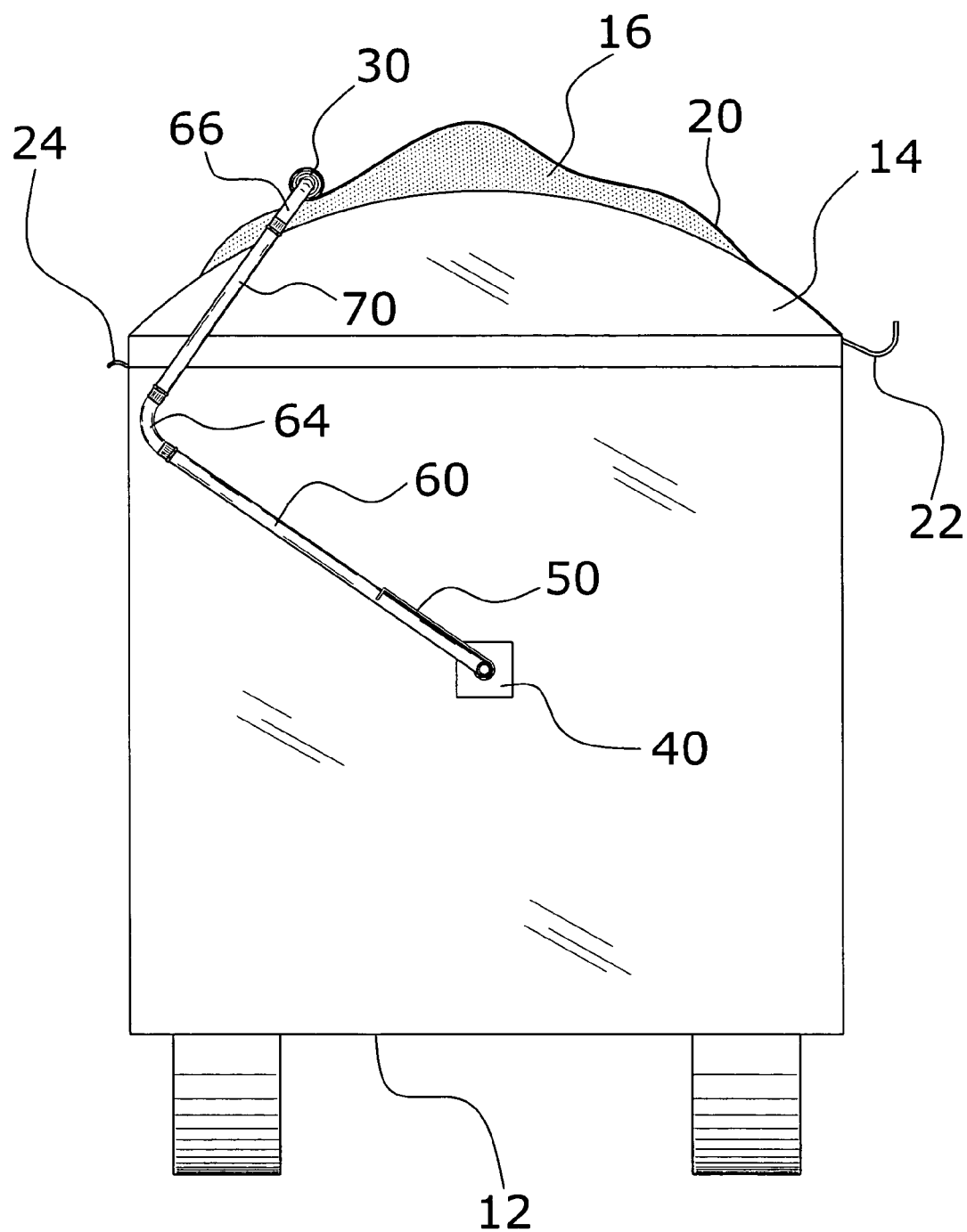
FIG. 13d is a rear view of the alternative embodiment in the partially closed position.
Figure 13E:
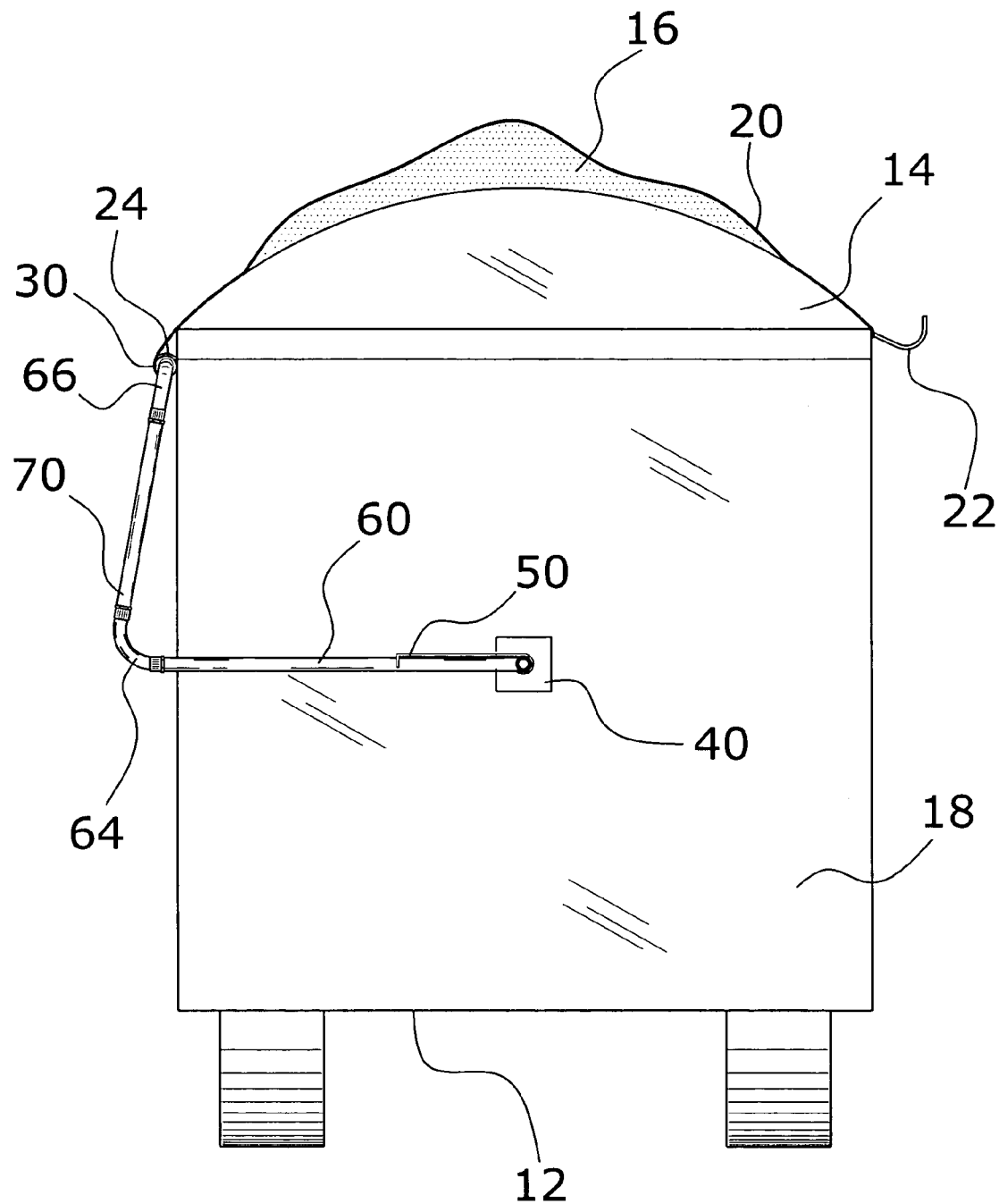
FIG. 13e is a rear view of the alternative embodiment in the closed position.

As the roller 30 moves in the closing direction, the front bias member 74 applies an extending force to the front outer arm 72 thereby encouraging the front outer arm 72 to extend to have less of an angle with respect to the front inner arm 62. The extending force applied by the front bias member 74 causes the straightening of the front outer arm 72 which in effect elevates the roller 30 above the load 16 as shown in FIGS. 7b and 7c of the drawings. As the actuator 32 continues to rotate the roller 30 in the closing position until the roller 30 is fully extended as shown in FIG. 7e of the drawings. When the roller 30 is in the closed position, the front bias member 74 is bent in a direction opposite of the initial open position as shown in FIG. 7e of the drawings. The user is then able to transport the load 16 to a desired location as required. To open the container, the above-stated process is simply reversed wherein the actuator causes the tarp to be wound upon the roller which causes the roller to move in an opening direction.

When the alternative embodiment illustrated in FIGS. 8a through 16 of the drawings is utilized, the rear door or gate 18 is able to be opened without interfering with the position of the roller 30 or requiring removal of the rear support structure. FIGS. 8b and 9b best illustrate the flexibility of the second bias member 66 when the door or gate 18 is opened.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A roll tarp system, comprising:
    a tarp attached to a side of a container;
    a roller attached to said tarp;
    a rear inner arm pivotally attached to said container;
    a first bias member attached to said rear inner arm;
    a rear outer arm attached to said first bias member;
    a second bias member attached to said rear outer arm and rotatably connected to a rear end of said roller; and
    a front support structure rotatably connected to a front end of said roller.

2. The roll tarp system of claim 1, including a rear spring attached to a rear portion of said container for applying a closing bias force upon said rear inner arm.

3. The roll tarp system of claim 1, wherein said front support structure includes an actuator attached to said roller for rotating said roller.

4. The roll tarp system of claim 1, wherein said first bias member is comprised of a compression spring concentrically attached between said rear inner arm and said rear outer arm.

5. The roll tarp system of claim 1, wherein said first bias member is comprised of a compression spring surrounded by a resilient cover concentrically attached between said rear inner arm and said rear outer arm.

6. The roll tarp system of claim 5, wherein said resilient cover is comprised of a rubber tube.

7. The roll tarp system of claim 1, wherein said second bias member is comprised of a compression spring concentrically attached between said rear outer arm and said roller.

8. The roll tarp system of claim 1, wherein said second bias member is comprised of a compression spring surrounded by a resilient cover concentrically attached between said rear outer arm and said roller.

9. The roll tarp system of claim 8, wherein said resilient cover is comprised of a rubber tube.

10. The roll tarp system of claim 1, including an axle attached to said second bias member and rotatably connected to said roller.

11. A roll tarp system, comprising:
a tarp;
a roller attached to said tarp;
a rear inner arm pivotally attached to a container;
a first bias member attached to said rear inner arm;
a rear outer arm attached to said first bias member;
a second bias member attached to said rear outer arm and rotatably connected to a rear end of said roller; and
a front support structure rotatably connected to a front end of said roller.

12. The roll tarp system of claim 11, including a rear spring attached to a rear portion of said container for applying a closing bias force upon said rear inner arm.

13. The roll tarp system of claim 11, wherein said front support structure includes an actuator attached to said roller for rotating said roller.

14. The roll tarp system of claim 11, wherein said first bias member is comprised of a compression spring concentrically attached between said rear inner arm and said rear outer arm.

15. The roll tarp system of claim 11, wherein said first bias member is comprised of a compression spring surrounded by a resilient cover concentrically attached between said rear inner arm and said rear outer arm.

16. The roll tarp system of claim 15, wherein said resilient cover is comprised of a rubber tube.

17. The roll tarp system of claim 11, wherein said second bias member is comprised of a compression spring concentrically attached between said rear outer arm and said roller.

18. The roll tarp system of claim 11, wherein said second bias member is comprised of a compression spring surrounded by a resilient cover concentrically attached between said rear outer arm and said roller.

19. The roll tarp system of claim 18, wherein said resilient cover is comprised of a rubber tube.

20. The roll tarp system of claim 11, including an axle attached to said second bias member and rotatably connected to said roller.

* * * * *